United States Patent
Tanabe et al.

(10) Patent No.: US 6,382,190 B1
(45) Date of Patent: May 7, 2002

(54) IN-TANK FUEL FILTER IMPROVED TO RESIST ELECTRIFICATION

(75) Inventors: Yuichi Tanabe; Takashi Nagai; Hironori Ueda, all of Obu (JP)

(73) Assignees: Aisan Kogyo Kabushiki Kaisha, Obu; Tokyo Roki Co. LTD, Yokohama, both of (JP)

( * ) Notice: Subject to any disclaimer, the term of this patent is extended or adjusted under 35 U.S.C. 154(b) by 0 days.

(21) Appl. No.: 09/380,590

(22) PCT Filed: Mar. 11, 1998

(86) PCT No.: PCT/JP98/01036

§ 371 Date: Sep. 10, 1999

§ 102(e) Date: Sep. 10, 1999

(87) PCT Pub. No.: WO98/40620

PCT Pub. Date: Sep. 17, 1998

(30) Foreign Application Priority Data

Mar. 11, 1997 (JP) .............................................. 9-056487
Mar. 11, 1997 (JP) .............................................. 9-056488
Aug. 19, 1997 (JP) .............................................. 9-222706

(51) Int. Cl.$^7$ .............................................. F02M 37/04
(52) U.S. Cl. ..................... 123/509; 123/514; 210/416.4
(58) Field of Search ............................... 123/509, 510, 123/514, 495, 497; 210/85, 416.1, 416.4, 443, 444

(56) References Cited

U.S. PATENT DOCUMENTS

| | | | |
|---|---|---|---|
| 4,592,836 A | * | 6/1986 | Chiao .......................... 210/168 |
| 5,085,773 A | | 2/1992 | Danowski |
| 5,164,084 A | | 11/1992 | Danowski et al. |
| 5,367,998 A | | 11/1994 | Shiohara et al. .............. 123/457 |
| 5,380,432 A | * | 1/1995 | Brandt ........................ 210/243 |
| 5,392,750 A | | 2/1995 | Laue et al. .................. 123/509 |
| 5,607,578 A | | 3/1997 | Ohkouchi et al. ........... 210/172 |
| 5,613,476 A | | 3/1997 | Oi et al. ...................... 123/509 |
| 5,649,514 A | * | 7/1997 | Okada et al. ................ 123/514 |
| 5,662,455 A | | 9/1997 | Iwata et al. ................. 123/516 |
| 5,762,047 A | * | 6/1998 | Yoshioka et al. ............ 123/509 |

(List continued on next page.)

FOREIGN PATENT DOCUMENTS

| | | |
|---|---|---|
| DE | 4433301 | 3/1996 |
| DE | 4444854 | 6/1996 |
| DE | 19509143 | 9/1996 |

(List continued on next page.)

OTHER PUBLICATIONS

U.S. Application S/N 09/715,267 (claims only).

*Primary Examiner*—Willis R. Wolfe
*Assistant Examiner*—Mahmoud Gimie
(74) *Attorney, Agent, or Firm*—Dennison, Scheiner & Schultz

(57) ABSTRACT

This invention relates to a filter in which a fuel pump for drawing fuel from a tank and a fuel filter unit for filtering foreign matter from the fuel which has been drawn from the tank by the fuel pump are integrally assembled together. More particularly, the invention relates to a filter improved such that the amount of electric charge, which builds up on the filter, is not increased to such an extent that the resin is rapidly deteriorated. In one embodiment, when forming a filter by assembling a generally cylindrical filter element around an outer periphery of a generally cylindrical pump, a cover for covering the filter element is made of a nonconductive material, and the generally cylindrical filter element is of the type which filters foreign matter from the fuel by causing the fuel to flow radially therethrough. With this type of filter element, the amount of electric charge can be reduced. Therefore, by covering the filter element with a nonconductive cover and disposing it within a tank, corona discharge is generated from the surface of the cover when the cover is exposed above the fuel remaining in the tank to thereby present a problem of electric discharge. Thus, the amount of electric charge on the surface of the cover can be controlled so as not to increase the resin deterioration rate.

42 Claims, 16 Drawing Sheets

U.S. PATENT DOCUMENTS

| | | | |
|---|---|---|---|
| 5,772,393 A | 6/1998 | Nakamura et al. | 123/55.4 |
| 5,782,223 A * | 7/1998 | Yamashita et al. | 123/510 |
| 5,900,140 A * | 5/1999 | Nagai et al. | 210/85 |
| 5,900,145 A | 5/1999 | Nagai et al. | |
| 6,129,074 A * | 10/2000 | Frank | 123/509 |
| 6,156,201 A | 12/2000 | Ueda et al. | |

FOREIGN PATENT DOCUMENTS

| | | |
|---|---|---|
| DE | 19530526 | 2/1997 |
| EP | 0166160 | 1/1986 |
| EP | 0702142 | 3/1996 |
| EP | 0754483 | 1/1997 |
| EP | 0898073 | 2/1999 |
| GB | 2304821 | 3/1997 |
| JP | 55-37584 | 3/1980 |
| JP | 55-88005 | 6/1980 |
| JP | 56-120356 | 9/1981 |
| JP | 59-194071 | 11/1984 |
| JP | 2-45651 | 2/1990 |
| JP | 3105054 | 5/1991 |
| JP | 4109465 | 9/1992 |
| JP | 6500373 | 5/1998 |
| WO | 9803787 | 1/1998 |

\* cited by examiner

IN-TANK FUEL FILTER IMPROVED TO RESIST ELECTRIFICATION

FIELD OF THE INVENTION

The present invention relates to a fuel filter for filtering foreign matter from fuel drawn by a fuel pump from a fuel tank. In particular, the present invention relates to an in-tank fuel filter system that is used in a fuel tank, and more particularly, to an in-tank fuel filter system that has improved resistance to static electricity.

In this specification, a fuel pump is simply referred to as a pump, a fuel tank as a tank, and a filter used in the tank as an in-tank filter system.

BACKGROUND OF THE INVENTION

An example of such an in-tank filter system is disclosed in German Patent Application No. P 42 42 242.6 (which corresponds to Japanese Laid-Open Patent Publication No. 6-213091). In this example, a filter is constructed in modules by assembling a generally cylindrical filter unit around a generally cylindrical pump. The filter module is disposed for use within a tank.

DISCLOSURE OF THE INVENTION

The known in-tank filter module system is very effective for simplifying the process of mounting the pump and the filter unit in the tank. However, in this design, no particular consideration was given to the fact that the filter and the fuel become electrically charged.

When fuel passes through the filter element to filter foreign matter from the fuel, the fuel flows against the filter element. Because of friction, the fuel becomes positively charged and the filter element becomes negatively charged. When the fuel is charged, the fuel piping also becomes charged. The fuel piping is normally attached to a vehicle body by an insulating elastic element, such as a rubber bushing, in order to protect the fuel piping from vibrations. Therefore, the fuel piping is electrically insulated from the vehicle body. Electrification of the fuel piping causes an electric discharge between the fuel piping and the metal vehicle parts adjacent to the fuel piping. The electric discharge may possibly damage the fuel pipe wall. Some instances of serious fuel pipe wall damage have actually occurred as a result of repeated static electric discharges.

Further, when the filter element becomes charged, this charge builds up on the filter element and the electric potential increases. As a result, the life of the filter element may be shortened and/or spark discharges may be generated. If the filter cover forming the filter surface is made of a nonconductive material such as a resin, the possibility of generating a spark discharge is reduced. However, the resin deteriorates as a result of this electrification and thus, the filter life is shortened. If the filter cover is made of a conductive material such as a metal, the life is not shortened significantly, but spark discharges tend to be readily generated. Thus, the charge generated by the filtering process causes serious problems for the filter and the fuel piping as well.

In the known filter, however, no particular consideration was given static charge build up. For example, in the known filter, the fuel is filtered by flowing axially, instead of radially, with respect to the cylindrical filter element. The amount of static charge that is generated in the fuel or on the filter element, when the fuel passes through the filter element to filter foreign matter from the fuel, is not only influenced by the total amount of fuel passing through the filter, but also by the flow rate and the time required for the fuel to pass through the filter element. The faster the flow rate, the more readily the filter element is electrically charged. Further, the longer the time required for the fuel to pass through the filter element, the more readily the filter element is electrically charged.

If a cylindrical filter element is used to filter the fuel, when the filter element is designed such that the fuel flows axially therethrough, the fuel flow rate, the contact distance of the fuel with the filter element and the time required for the fuel to pass through the filter element are increased as compared with a filter element in which the fuel flows radially through the filter element. To the contrary, when the fuel flows radially, the fuel flow rate, the contact distance of the fuel with the filter element and the required time for the fuel to pass through the filter element are reduced. As a result, the amount of electric charge generated on the filter element, through which the fuel flows radially, is much less than an axial-flow type filter element. Nevertheless, in the known in-tank filter system, the axial fuel filtering method is utilized and no attempt was made to prevent the filter and the fuel from becoming electrically charged.

The most common method taken to prevent electrification of the filter is to discharge the electric charge. It is generally believed that the electric charge cannot be discharged if the filter cover forming the filter surface is made of resin. Therefore, in the commonly used designs, the filter cover is made of metal and a ground wire is connected between the metal cover and the vehicle body or the like, so that electric charge built up on the filter cover is discharged to the vehicle body or the like. When the filter is made of metal, the manufacturing cost is increased, and the design options for the cover configuration are limited. In view of these factors, a method in which the filter cover is made of conductive resin was proposed and disclosed in International Patent Publication No. WO 92/04097 (corresponding to Japanese Laid-Open Patent Publication No. 6-500373). This publication discloses a technique in which a filter cover is made of a conductive resin and a ground wire is connected between the cover and the vehicle body, so that electric charge built up on the filter cover is discharged.

However, some disadvantages are recognized in such a design in which the filter cover is made of a conductive material, such as a metal or a conductive resin, and is connected to a ground wire to discharge the electric charge built-up on the filter. First, the electric charge on the filter can be discharged, but the electric charge in the fuel cannot be discharged. Further, no measures are taken to prevent electrification of the fuel piping. As described above, if the fuel piping, which is normally connected to a vehicle body or the like by an insulating member such as a rubber bushing, becomes electrically charged, spark discharges will be generated between the fuel piping and the vehicle body, which may seriously damage the fuel piping. This problem is not eliminated even if the filter cover is made of a conductive material and is connected to a ground wire.

Further, as disclosed in WO92/04097, if the filter cover is made of a conductive resin, the bulk resistivity of the filter cover can not be significantly reduced, and the electrifying potential can not be reduced to zero, even if a ground wire is connected to the filter cover. It is particularly difficult to uniformly reduce bulk resistivity and some portions of the filter cover tend to have locally high resistance. As a result, some portions tend to have locally high electric potential. When the portions having high potential are brought close to the tank during replacement of the filter or a similar operation, a spark discharge may be generated. Further, concentrated electric discharge currents pass through the conductive resin in the vicinity of the mounting portion of the ground wire, so that the resin is likely to deteriorate.

If the filter cover is made of metal, most of the above problems can be solved. However, serious problems still remain unsolved, such as the filter cover manufacturing costs are increased and the filter cover design options are limited. Further, the problem that the fuel or the fuel piping will become electrically charged is not solved.

Accordingly, an object of the present invention is to teach a new in-tank filter system that can effectively cope with a troublesome problem of electric charge that is caused by the known filter.

Another object of the invention is to form a filter cover without using a special resin, such as a conductive resin.

Still another object of the invention is to eliminate the need to connect a ground wire to the filter cover.

In one aspect of the present invention, a cover of a generally cylindrical filter element that is disposed for use in a tank is made of a nonconductive resin and the filter element is of the type that filters foreign matter from the fuel by causing the fuel to flow radially therethrough. The above-noted WO92/04097 discloses the use of a filter element that filters foreign matter from fuel by causing the fuel to flow radially therethrough and to form a cover for the filter element from a nonconductive resin. However, the filter of this known design is used outside of the fuel tank. Accordingly, it was recognized in this publication that the resin filter cover might be damaged by electrification using this type of filter. Therefore, the publication proposed to form the filter cover from a conductive resin in order to prevent such occurrence.

However, the present inventors conducted various experiments and found that a nonconductive resin filter cover can be disposed within the tank and the resin cover can be prevented from rapidly deteriorating as a result of electrification of the nonconductive resin cover, if the fuel flows radially through the filter element so that the filter element does not easily become electrically charged. Thus, a long service life can be achieved. As a result, the present inventors have succeeded for the first time in making a commercially viable in-tank filter system having a nonconductive resin cover.

In the filter according to this aspect of the invention, the filter cover is not grounded to the vehicle body or the like and therefore, its electrifying potential is not zero. However, because the filter cover is made of nonconductive material having a high bulk resistivity, rapid movement of the electric charge is restrained. Thus, even if the resin filter cover is brought close to a metal part having a different electric potential, a spark discharge will not be generated.

In another aspect of the invention, in a filter that is formed by assembling a generally cylindrical filter element around an outer periphery of a generally cylindrical pump, the surface of the filter element is made of a nonconductive material, and the generally cylindrical filter element is of the type that filters foreign matter from the fuel by causing the fuel to flow radially therethrough. With this type of the filter element, the amount of electric charge can be reduced. Therefore, by covering the filter element with a nonconductive cover and disposing it within a tank, corona discharge is generated from the surface of the cover when the cover is exposed above the fuel remaining in the tank to thereby prevent electric charge problems. The energy of the corona discharge is low, so that no particular problems are caused.

Thus, as a result of corona discharges, the amount of electric charge on the filter cover surface can be reduced to such an extent that the life of the resin cover is not shortened. Further, because the filter cover is made of a nonconductive material having a high bulk resistivity, rapid movement of the electric charge is restrained. Thus, even if the resin filter cover is brought close to a metal part having a different electric potential, a spark discharge will not be generated.

In a still another aspect of the invention, the filter element has two covers. In this specification, the inner cover will be called a case and the outer cover will be called a housing. Both the case and the housing cover the filter element. At least the outer cover (housing) is made of a nonconductive material and the filter is disposed within a tank. With such a construction, electric charge generated on the filter surface can be reduced to such an extent that the housing life is not shortened.

In a further different aspect of the present invention, return fuel flows along the filter. Thus, electric charge generated on the filter is discharged and sounds produced by the return fuel dropping into the fuel tank are reduced.

The present invention will be more apparent from the following detailed description of the best modes for performing the invention.

BEST MODE FOR PERFORMING THE INVENTION

Best modes of performing the present invention will now be explained.

First Embodiment

Figure 7:
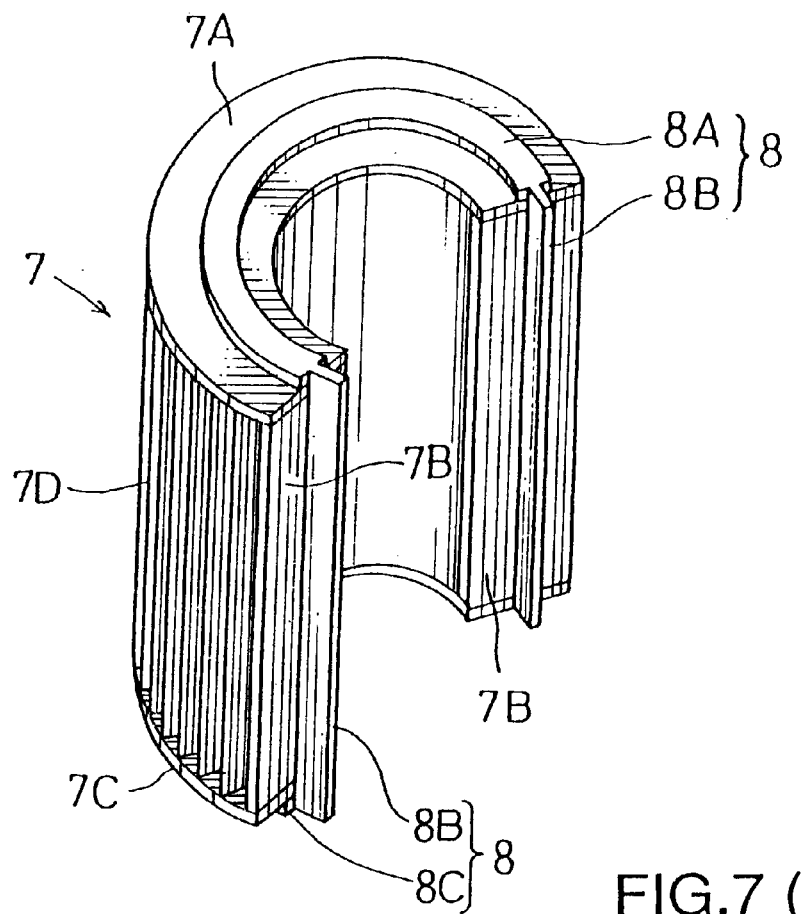
FIGS. 7(a) and 7(b) show a shield member of the filter element.
Figure 7:
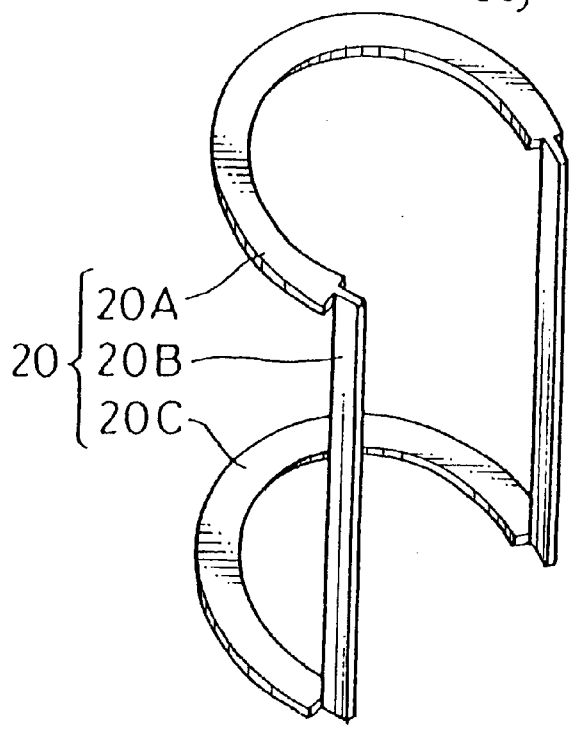

Filter element 7 will be explained first. As best shown in FIG. 7(a), filter element 7 is constructed by pleating a sheet-like filter material 7D along a plurality of parallel lines and by bending the pleated material to have a generally C-shaped cross-section. A generally C-shaped upper end plate 7A and a generally C-shaped lower end plate 7C are fixed to the upper and lower end surfaces, respectively, of the filter material 7D. Also, a pair of side end plates 7B are fixed to the side ends of the filter material 7D. The filter material 7D and each of the end plates 7A, 7B, 7C are attached together without any clearance so as to be water-tight. A resilient shield element 8 (8A, 8B, 8C) is joined to the outer side of the associated end plates 7A, 7B, 7C. The shield element 8 is brought into close contact with an inner wall of a case 2 which will be described below when the filter element 7 is disposed within the case 2. As a filter element, various kinds of filter elements may be used other than the pleated filter material 7D, such as a honeycomb structure or a vortex structure. Further, a shield element 20 shown in FIG. 7(b) may be used instead of the shield element 8.

Figure 1:
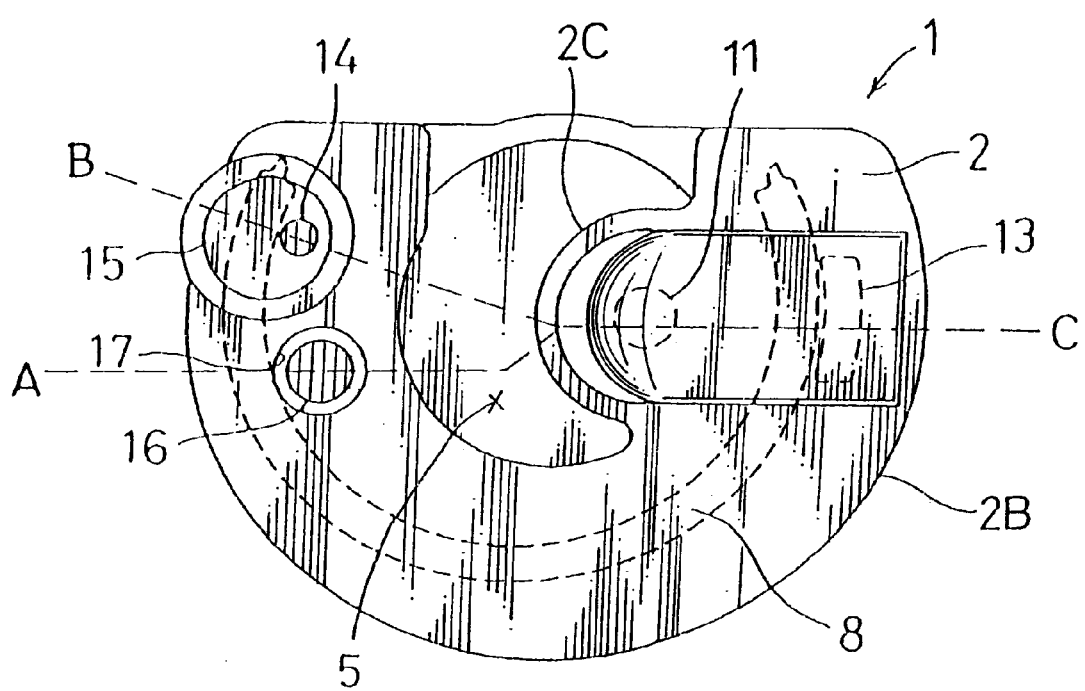
FIG. 1 is a plan view showing a filter unit according to a first embodiment, which is used in a filter of the invention.
Figure 2:
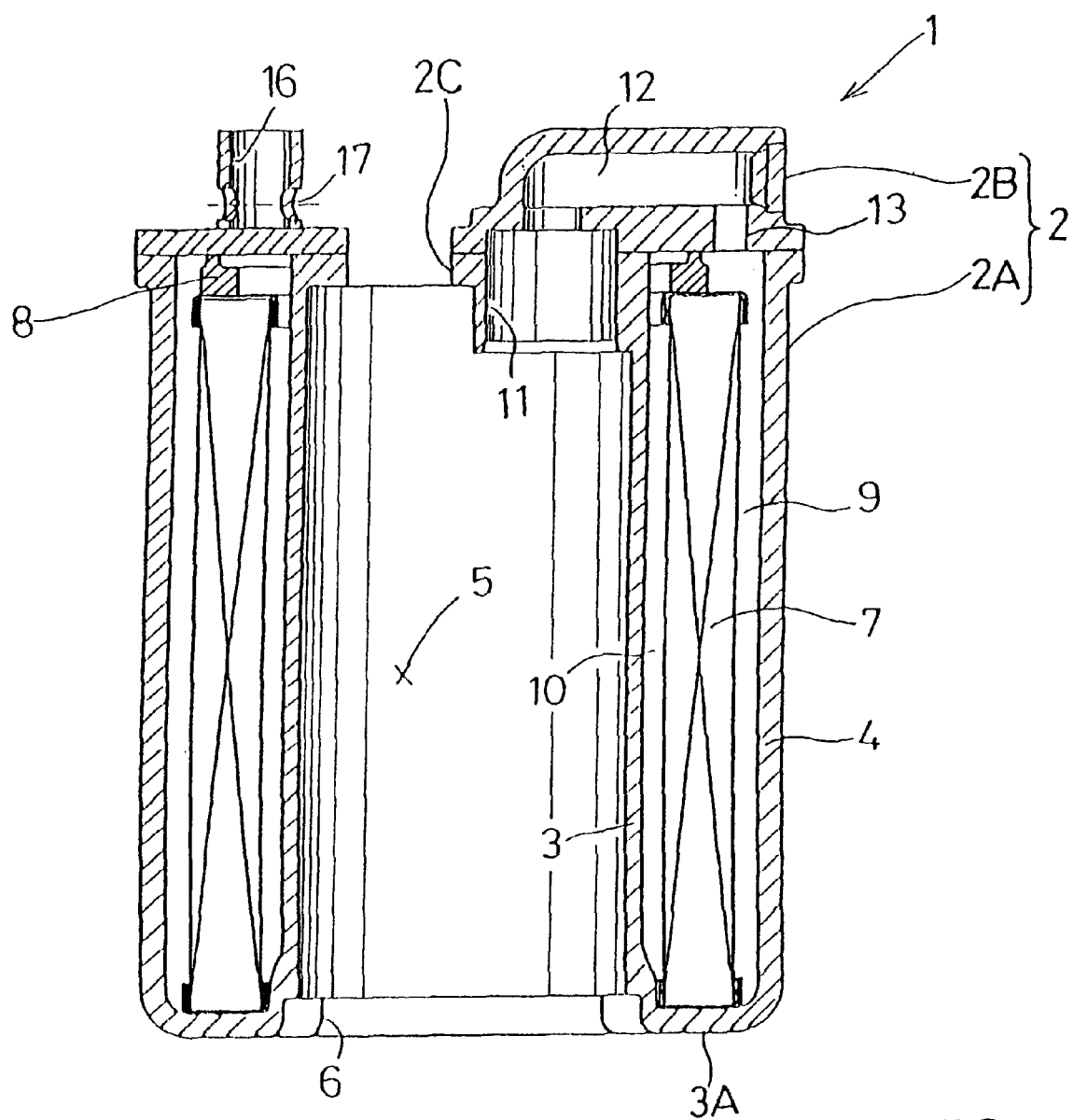
FIG. 2 is a sectional view taken along line A–C in FIG. 1.
Figure 3:
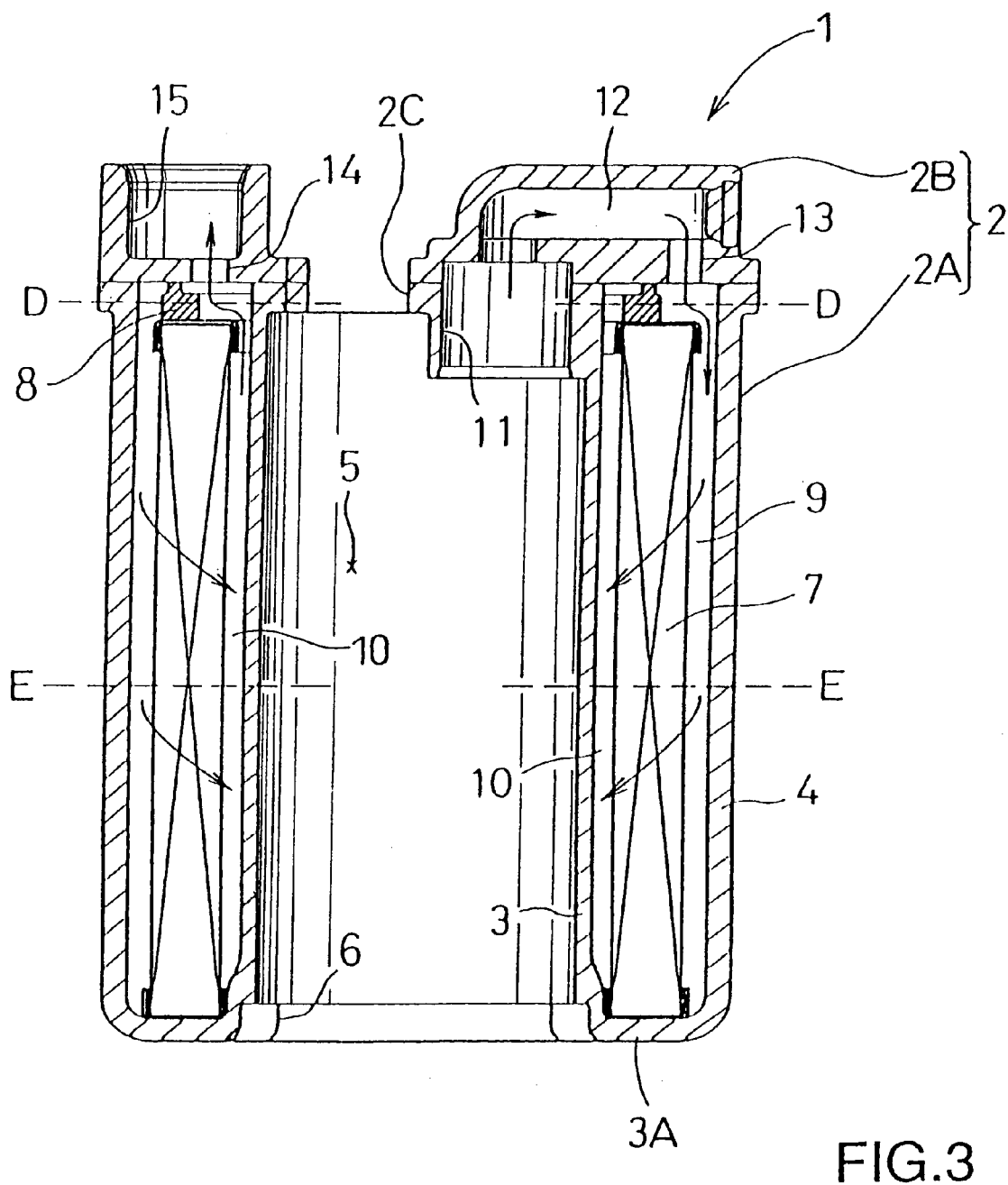
FIG. 3 is a sectional view taken along line B–C in FIG. 1.
Figure 4:
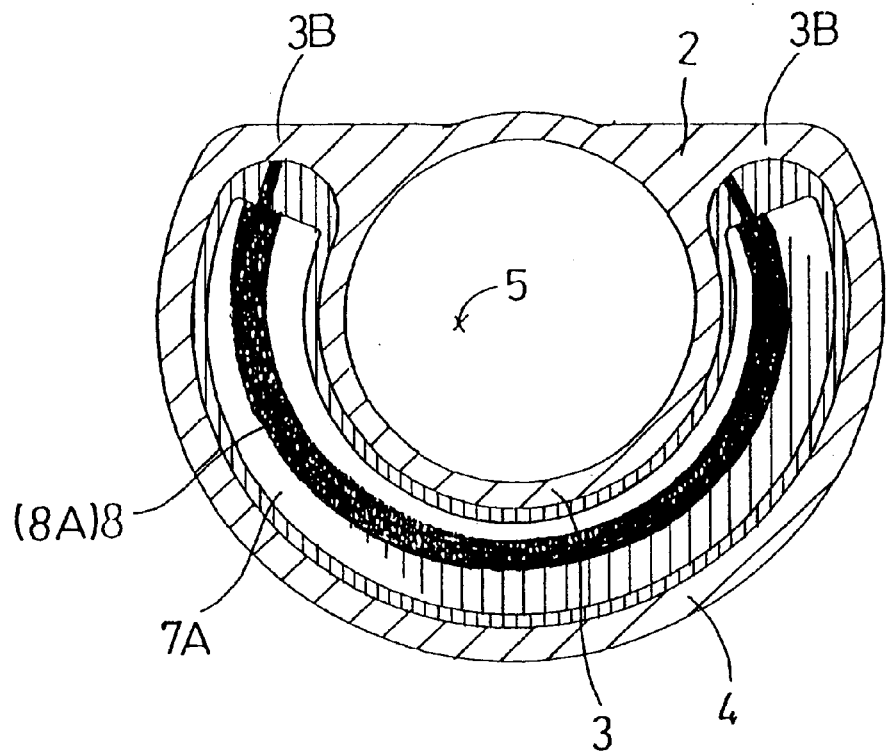
FIG. 4 is a sectional view taken along line D—D in FIG. 3.

Case 2 for housing the filter element 7 will be explained next. FIGS. 1 to 3 show the filter element 7 accommodated within the case 2, which combination comprises a filter unit 1. FIG. 1 is a plan view showing the filter unit 1 according to the first embodiment, FIG. 2 is a sectional view taken along line A–C in FIG. 1 and FIG. 3 is a sectional view taken along line B–C in FIG. 1.

Figure 5:
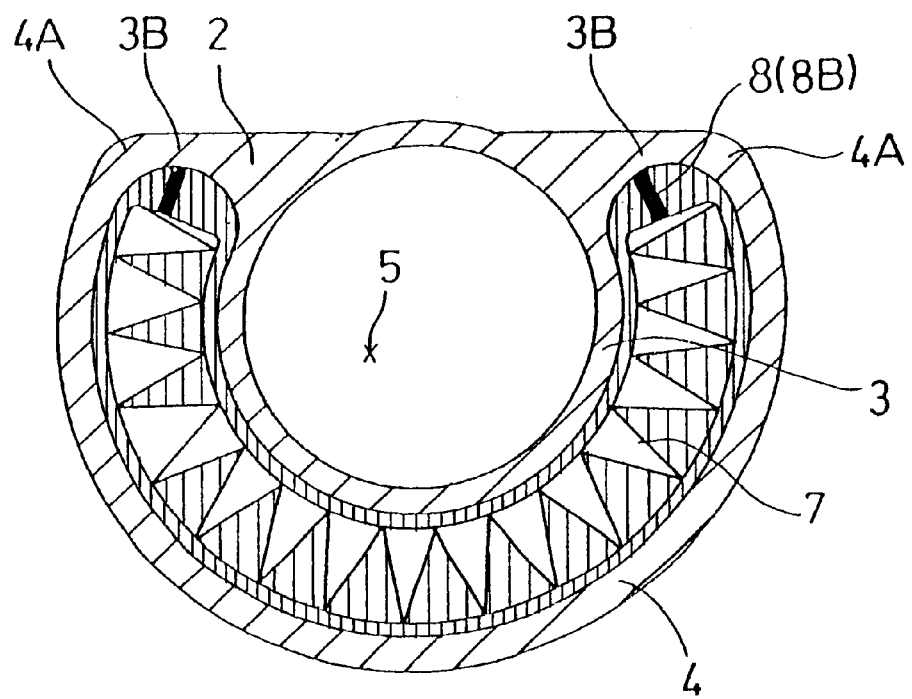
FIG. 5 is a sectional view taken along line E—E in FIG. 3.

As shown in FIGS. 1 to 3, the case 2 of the filter unit 1 consists of a case body 2A and a case cap 2B, both of which are made of an electrically conductive resin or a non-conductive resin. The case body 2A is a double cylindrical structure with a bottom that includes an inner peripheral wall 3, an outer peripheral wall 4, and a generally annular bottom wall 3A that connects the inner and outer peripheral walls 3 and 4. As clearly shown in FIG. 1, the case 2 has a generally D-shaped cross-section. Specifically, as best shown in FIG. 5, a peripheral portion of the outer peripheral wall 4 is cut away to terminate at peripheral ends 4A. The peripheral ends 4A of the outer peripheral wall 4 are connected to the inner peripheral wall 3 through sidewall 3B.

The filter element 7 is inserted into a generally C-shaped space between the inner peripheral wall 3 and the outer peripheral wall 4. Then, the case cap 2B closes the open top of the case body 2A. Thus, the case 2 is formed and the filter unit 1 is constructed. At this time, the generally C-shaped shield element 8A is in tight contact with the case cap 2B, which prevents fuel from passing through a clearance that may otherwise be made between the filter element 7 and the case cap 2B. The generally C-shaped shield element 8C is also in tight contact with the bottom plate 3A, which prevents fuel from passing through a clearance that may otherwise be made between the filter element 7 and the bottom plate 3A. Further, the generally linear shield elements 8B are in tight contact with the side wall 3B, which prevents fuel from passing through a clearance that may otherwise be made between the filter element 7 and the side walls 3B. With the four peripheries of the filter element 7 being tightly pressed against the inner surface of the case 2, the space having a generally C-shaped cross-section between the inner peripheral wall 3 and the outer peripheral wall 4 is partitioned off by the filter element 7 to have a water-tight seal. If the filter element 7 or the case 2 itself has a shielding function, the shield element 8 is not required to partition the space into an outer space and an inner space by the filter element 7 so as to be water-tight.

As clearly shown in FIGS. 2 and 3, the case cap 2B has an inlet mounting hole 11 that communicates with a fuel inlet chamber 9 (the space surrounded by the filter element 7 and the outer peripheral wall 4) through a fuel path 12 and a fuel inlet port 13. Further, as best shown in FIG. 3, the case cap 2B has an outlet mounting hole 15 that communicates with a fuel outlet chamber 10 (the space surrounded by the filter element 7 and the inner peripheral wall 3) through a fuel outlet port 14.

As clearly shown in FIG. 1, the generally C-shaped shield element 8 is fixed in a position offset from the center of the curvature of the filter element 7, so that the relatively large fuel inlet port 13 can be formed on the outer peripheral side of the filter element 7 (to be exact, the shield element 8) and the relatively large fuel outlet port 14 also can be formed on the inner peripheral side thereof. The shield element 8 is displaced inwardly on the right side of FIG. 1 to ensure a large space on the outer peripheral side thereof, while the shield element 8 is displaced outwardly on the left side of FIG. 1 to ensure a large space on the inner peripheral side thereof. Thus, a sufficiently large area for the openings of the fuel inlet port 13 and the fuel outlet port 14 is ensured.

As clearly shown in FIGS. 1 and 2, a cylindrical portion 16 is formed on the upper surface of the case cap 2B and is adapted to receive return fuel from an engine or a pressure regulator. The cylindrical portion 16 has a bottom surface that is closed by case cap 2B and has a plurality of openings 17 formed on the side thereof. Fuel flows into the cylinder 16, flows out through the plurality of openings 17 and flows radially from the cylindrical portion 16 along the surface of the case cap 2B. An opening 2C is formed in the case cap 2B above a pump accommodating space 5. When a small amount of fuel remains in the tank and the opening 2C is exposed above the surface of the remaining fuel, some of the fuel flowing along the surface of the case cap 2B runs into the opening 2C.

Figure 9:
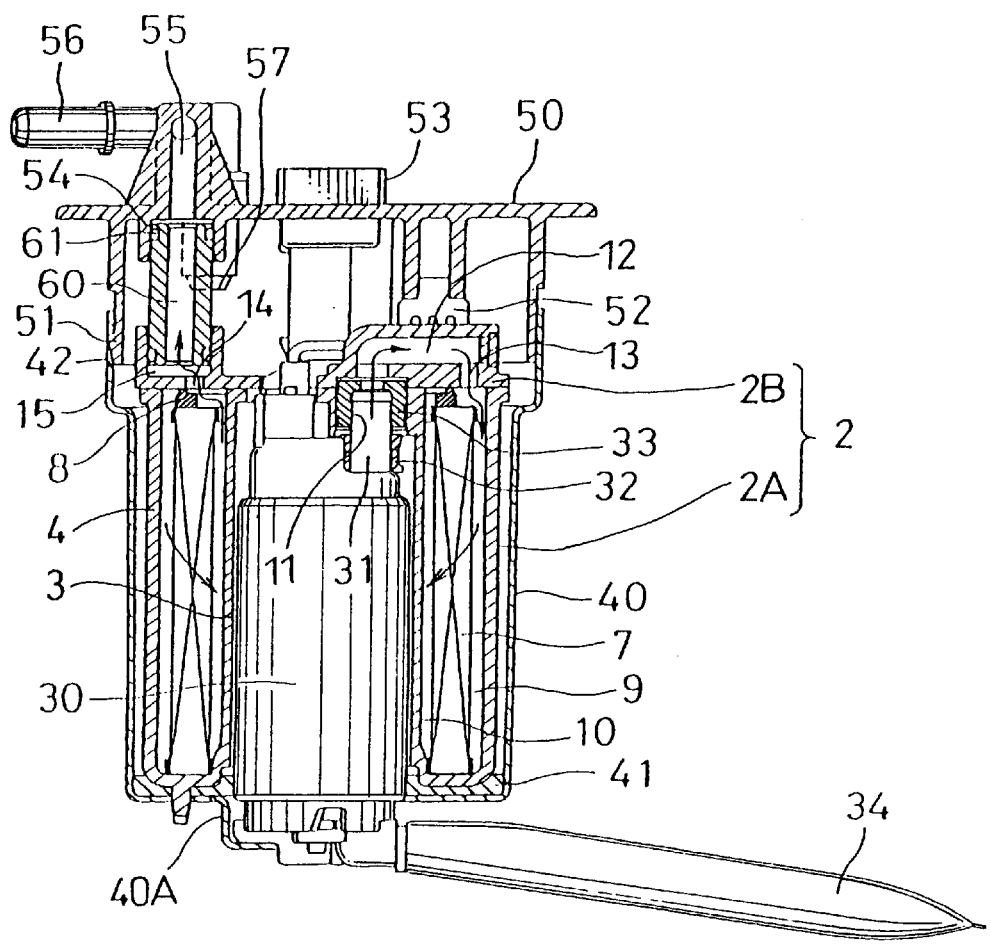
FIG. 9 is a sectional view taken along line F—F in FIG. 8.

The space 5 for accommodating a pump 30 is defined inside the inner peripheral wall 3 of the case body 2A. As shown in FIG. 9, the pump 30 is inserted into the pump accommodating space 5 through an opening 6 in the bottom side of the case body 2A. When the pump 30 is inserted into the pump accommodating space 5, a delivery port 31 of the pump 30 is connected to the inlet mounting hole 11 of the case 2 by means of a spacer 32 and a bushing 33.

A small clearance exists between the pump 30 and the inner peripheral wall 3. Even if a small amount of fuel remains in the tank and the module is exposed above the surface of the remaining fuel, the return fuel can flow through the cylinder 16, the openings 17, the upper surface of the case cap 2B and the opening 2C of the case cap 2B and into the clearance between the pump 30 and the inner peripheral wall 3. Thus, the clearance will be filled with the return fuel. Most of the fuel that has run along the surface of the case cap 2B runs down along the outer peripheral wall of the case body 2A. Consequently, the surface of the case 2 is always covered with fuel, so that electric discharges can easily occur. Further, after the flow rate of the return fuel has sufficiently decreased, the return fuel drops onto the surface of the fuel remaining in the tank. Therefore, sounds caused by dripping return fuel are decreased. As a result, electric charge on the case 2 is readily discharged and the charging potential of the case 2 is reduced.

The integral assembly of the pump 30 and the filter unit 1 is further enclosed in a housing, which integral assembly is simply referred to as a filter. The housing consists of a housing body 40 and a housing cap 50, which are both made of a nonconductive resin. In this example, the housing body 40 and the housing cap 50 comprise a cover that forms a surface of the filter.

The housing body 40 is cylindrical and has a bottom formed with an opening 40A and an open top. The integral assembly of the pump 30 and the filter unit 1 is inserted into the housing body 40 from the open top. Support element 41 is made of a nonconductive material, such as a nonconductive resin. The housing body 40 has a D-shaped cross-section to conform to the outside configuration of the case 2. When the integral assembly of the pump 30 and the filter unit 1 is inserted into the housing body 40, a suction port is formed in the lower end of the pump 30 and projects from the opening 40A. A bag-like primary filter 34 is connected to the suction port.

A return pipe fitting 56 for return fuel and a feed pipe fitting 58 for drawing fuel from the tank extend through the housing cap 50 and are fixed to the housing cap 50. An opening 54 of the feed pipe fitting 58 that opens at the underside of the cap 50 is formed in a position corresponding to the outlet mounting hole 15 shown in FIG. 1. Also, an opening 57 of the return pipe fitting 56 that opens at the underside of the cap 50 is formed in a position corresponding to the cylinder 16 shown in FIG. 1.

When the housing cap 50 is fixed on the upper end 42 of the housing body 40, the outlet mounting hole 15 of the case 2 is connected to the opening 54 of the feed pipe fitting 58 via a fuel supply pipe 60 and an O-ring 61. Further, the opening 57 of the return pipe fitting 56 is disposed opposite to the cylinder 16 formed on the case 2. A hose may be used to connect the opening 57 to the cylinder 16. Designated at 52 is a cushion for positioning the integral assembly of the pump 30 and the filter unit 1 and the housing (the housing body 40 and the housing cap 50). Designated at 53 is a power supply connector. A power terminal of the pump 30 is connected to the connector 53.

The integral assembly of the pump 30 and the filter unit 1 is assembled with the housing body 40 and the housing cap 50 to form a one-piece filter. The filter is inserted into and fixed to the tank (not shown). The surface of the filter comprises a nonconductive resin cover (the housing body 40 and the housing cap 50).

The operation of the filter will now be explained. The pump 30 draws fuel from the tank via the primary filter 34 and then directs the fuel into the fuel inlet chamber 9 through the delivery port 31, the fuel path 12 and the fuel inlet port 13. The fuel that has been directed into the fuel inlet chamber 9 radially passes through the filter material 7D of the filter element 7 and is directed into the fuel outlet chamber 10. At this time, the fuel is filtered. The filtered fuel is discharged out to the feed pipe fitting 58 through the fuel outlet port 14, the fuel supply pipe 60, and fuel path 55. One end of a feed pipe (not shown) is connected to the feed pipe fitting 58 and the other end thereof is connected to a fuel injector.

Further, the feed pipe is connected to a pressure regulator (not shown), which discharges the fuel when the fuel pressure within the feed pipe exceeds a predetermined value. The return pipe is connected to a fuel discharge port for discharging the fuel. The fuel that has been discharged into the return pipe is directed into the cylinder 16 through the return pipe fitting 56. The fuel then flows out through the plurality of openings 17 onto the surface of the case cap 2B. A portion of the flowing fuel runs down into the clearance between the pump 30 and the inner peripheral wall 3 of the case 2. On the other hand, most of the return fuel runs down into the clearance between the outer peripheral wall 4 of the case 2 and the housing body 40. Consequently, the inner and outer peripheral walls 3 and 4 of the case 2 and the inner surface of the housing 40 always contact the fuel.

The fuel that has returned via the return pipe runs down along the outer periphery of the pump 30 and the outer periphery of the case body 2A. These fuel paths have a long peripheral length and hence a large cross-sectional area. Therefore, the fuel slowly runs down in a thin film-like sheet around the pump 30 and the case body 2A. As a result, sounds produced by the return of the fuel can be reduced.

When the fuel passes through the filter element 7, the filter element 7, the case 2, the housing body 40 and the housing cap 50 become electrically charged. The electric charge does not readily build up on the surface of the housing body 40 and the housing cap 50 when a relatively large amount of fuel remains in the tank and thus, the housing body 40 and the housing cap 50 contact the fuel across a relatively large area. However, electric charge tends to readily build up on the surface of the housing body 40 and the housing cap 50 when the amount of the fuel remaining in the tank is reduced and thus, the housing body 40 and the housing cap 50 contact the fuel in a smaller area.

International Patent Publication No. WO92/04097 discloses a technique in which electric charge built up on the filter cover is taken into consideration. In this technique, in order to eliminate the problem that the filter cover made of nonconductive resin will be destroyed by electric charge, the filter cover is made of a conductive resin blended with conductive particles and a conductive path is ensured between the cover and a vehicle body. The present inventors have conducted various studies in an attempt to apply this technique to an in-tank system module of the present invention. As a result, the inventors discovered the following surprising facts.

First, when attempting to construct a filter cover made of conductive resin, the inventors found it difficult to make a filter cover having uniform conductive properties across the entire surface. A phenomenon is likely to occur in which the charging potential of the filter cover surface varies in location. If the charging potential varies in location and the filter cover is electrically conductive, a possibility exists that a spark discharge will be generated. Further, the conductive resin rapidly deteriorates in the vicinity of the mounting portion of the ground wire where electric discharge currents are concentrated. Further, as disclosed in WO92/04097, the electric charge in the fuel or on the fuel piping does not cause any serious problem when the filter is used outside of the tank near the engine. However, if the filter is installed within the tank, electric charge in the fuel or on the fuel piping has a serious effect on the life of the fuel piping. Thus, merely discharging static electricity built up on the filter cover can not be a solution to the problem of the electric charge of fuel or fuel piping. Therefore, in the in-tank filter system taught in WO92/04097, the preventative measures were found to be non-effective and useless.

The inventors found the following additional facts. The discharging environment of the filter of the present invention, which is used within a tank, is totally different from that of the filter shown in WO92/04097, which is used outside of a tank. If the filter is used within a tank, the filter is covered with fuel vapor, even if a small amount of fuel remains in the tank and the filter is exposed above the fuel surface. Therefore, the filter presents a different discharging property from that of a filter disposed in a gas atmosphere.

Further, the charging potential of the filter cover can be decreased to a considerable degree by utilizing return fuel to accelerate electric discharge. Therefore, in the case of an in-tank filter system, if the filter element is of a type that does not readily become charged, the surface of the filter case will not be destroyed, even if it is nonconductive. Rather, corona discharges are continuously generated from the nonconductive filter surface. As a result, the discharging potential of the filter is not increased to such an extent that the life of the resin filter cover is shortened. Further, even if the filter surface is brought into contact with or close to the tank during maintenance or repair operations, movement of the charge is restrained because the filter surface has a large bulk resistivity. Consequently, generation of spark discharge can be effectively restrained.

Figure 6:
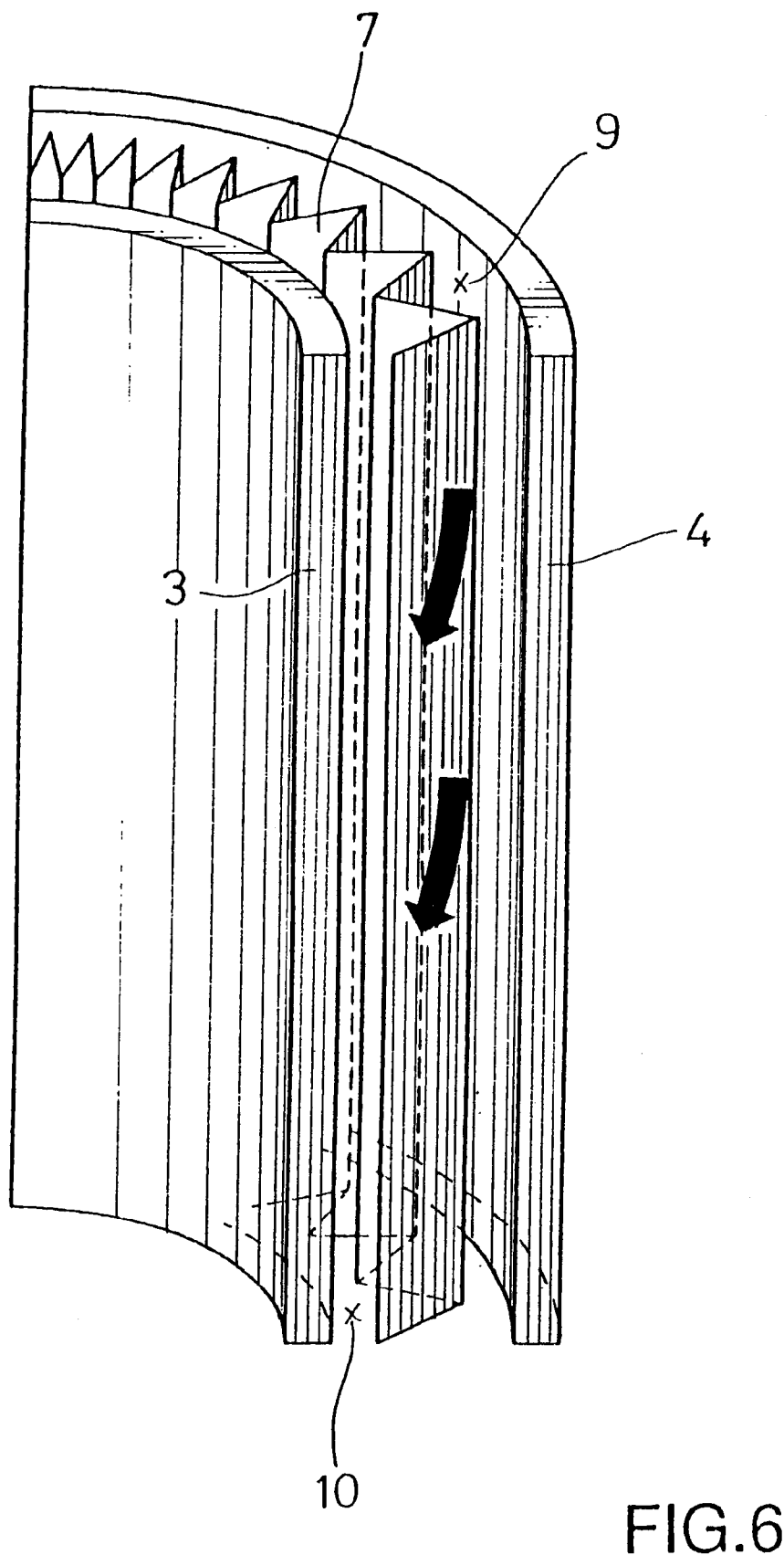
FIG. 6 is a perspective view of a filter element of the first embodiment.

This embodiment has been designed on the basis of such findings and confirmation. As best shown in FIG. 6, in this embodiment, a filter element is used in which fuel passes radially through the filter element and the outermost surface of the filter is made of a nonconductive material. If this filter is used within the tank, not only the discharging potential that is generated in the filter element is reduced, but the surface potential of the filter is also reduced by corona discharge being generated from the filter surface. Further, spark discharge is not readily generated because the filter surface is made of a nonconductive material that has high bulk resistivity. When the filter surface is made of a nonconductive material, even if the filter surface is brought into contact with the tank during some operation, charge that has built up on the filter surface (housing body 40 in this embodiment) does not move away rapidly. Consequently, generation of spark discharge can be effectively restrained.

Figure 20:
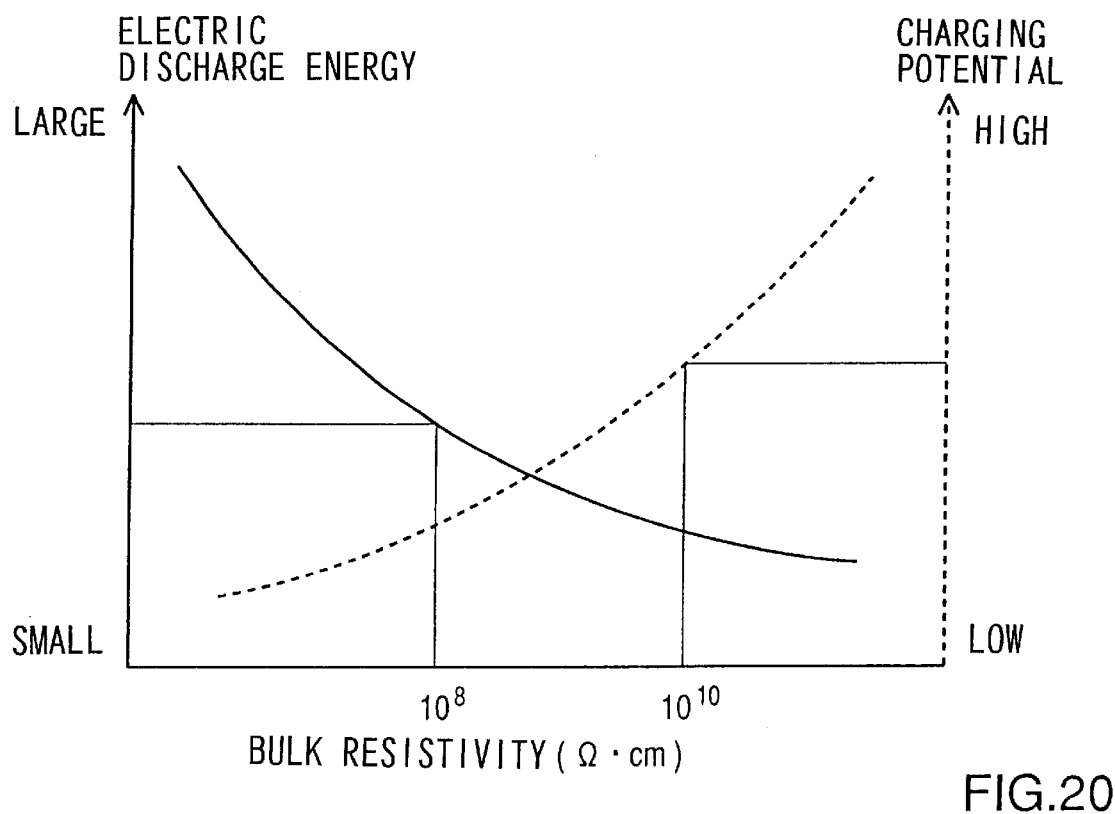
FIG. 20 is a graph showing the relation between electric discharge energy and charging potential in relation to the bulk resistivity of a filter cover.

FIG. 20 shows the relation of the electric discharge energy and the charging potential to the bulk resistivity of the element that forms the filter surface. When the bulk resistivity is $10^8$ to $10^{10}$ Ω·cm, electric discharge energy is held low and at the same time the charging potential is also held low. The electric discharge energy and the charging potential are in a good balance within the range from $10^8$ to $10^{10}$ Ω·cm. Therefore, it is preferable to choose the filter case material from materials that have a bulk resistivity within the above range.

Further, in this embodiment, the filter element 7 is enclosed in the case 2 and the case 2 is accommodated within the housing body 40 and the housing cap 50. Thus, the filter element 7 is doubly covered. In this case, if the outer cover (the housing body 40 and the housing cap 50 in this embodiment) is nonconductive, the principle of the present invention is achieved. The inner cover (case 2 in this embodiment) may be made of either type of material, i.e. conductive or nonconductive. In either case, continuous corona discharge can be obtained from the outer cover (the housing body 40 and the housing cap 50) and deterioration of the filter cover can be effectively prevented.

Further, in this embodiment, return fuel flows along the surfaces of the case 2, the housing body 40 and the housing cap 50, so that the electric charge that has built up on the surfaces of the case 2, the housing body 40 and the housing cap 50 is reduced. This charge reducing effect that results by causing the return fuel to run along the case and the housing, is effective when the fuel remaining in the tank is reduced and the contact area of the housing with the fuel in the tank is also reduced, so that the electric charge on the filter surface will not readily discharge. Further, the return fuel that has been received in the cylinder 16 is directed through the plurality of openings 17 to a wider surface area of the case cap 2B, so that the charging potential of the surface of the case 2 or the housing 40, 50 can be uniformly decreased over the entire surface area.

Figure 10:
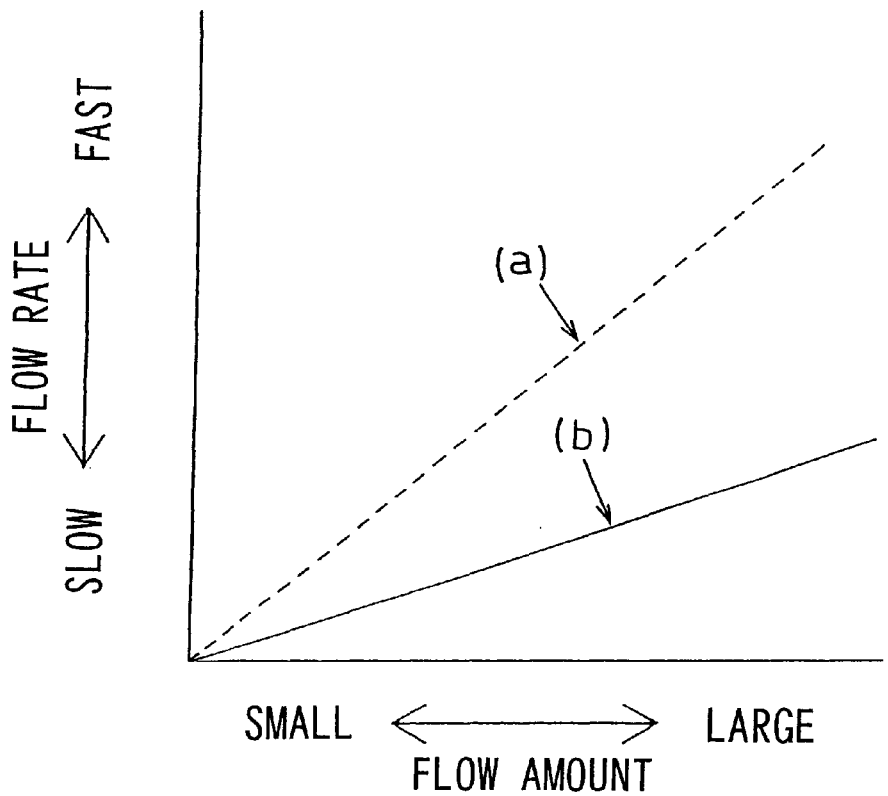
FIG. 10 is a graph showing the relation between the flow amount and the flow rate (a) when using a filter element having a honeycomb structure and (b) when using a filter element formed by pleating the filter into a chrysanthemum-like shape.
Figure 19:
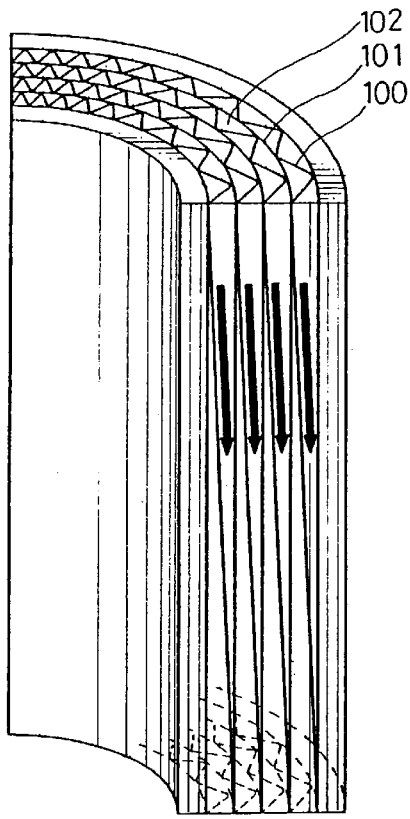
FIG. 19 is a filter element used in a known filter.

In the case of a generally cylindrical filter element, if it is of the type through which fuel passes radially to be filtered as shown in FIG. 6, the passing area is the peripheal direction length multiplied by the height. On the other hand, as shown in FIG. 19, if it is of the type through which fuel passes axially to be filtered, the passing area us the peripheal direction length multiplied by the thickness of the filter material. Typically, the former is far greater than the latter. Therefore, if the amount of fuel that is filtered per unit time is equal, the passing flow rate is lower in the case of the former filter than in the latter filter. FIG. 10 shows the relationship between the flow amount and the flow rate of the fuel for (a) a filter through which the fuel flows axially and (b) a filter through which the fuel flows radially. Clearly, if the flow amount is equal, the flow rate is higher in the case of the axial-flow filter than in the radial-flow filter.

Figure 11:
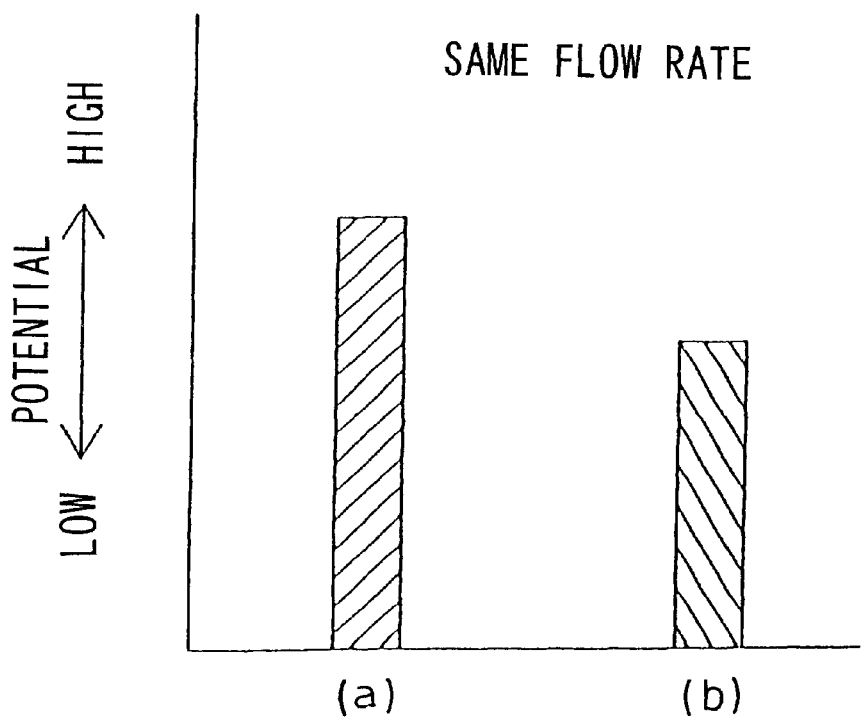
FIG. 11 is a graph showing electrical charge (a) when using a filter element having a honeycomb structure and (b) when using a filter element formed by pleating the filter into a chrysanthemum-like shape.

The amount of electric charge (charging potential) that builds up on the filter when the fuel passes through the filter depends on the passing flow rate of the fuel. As the flow rate increases, the charging potential also increases. FIG. 11 shows the relationship between the flow rate and the charging potential. The charging potential is higher for (a) a filter through which fuel flows axially at a higher rate and lower for (b) a filter through which fuel flows radially at a lower rate.

In practice, the discharging potential that builds up on the filter is also influenced by the time required for the fuel to pass through the filter. For radial flow, the contact time of the filter with the fuel is relatively short because of the thinness of the filter element, notwithstanding the fact that the fuel flow rate is relatively low. On the other hand, for axial flow, the contact time of the filter with the fuel is relatively long, because the fuel must pass through the height of the filter element, notwithstanding the fact that the fuel flow rate is relatively high. Therefore, using a radial-flow filter instead of an axial-flow filter can considerably decrease the amount of electric charge that is generated on the filter.

Thus, in view of these findings and particularly when the filter is used within a tank, the inventors have verified that generation of spark discharges can be prevented by using a filter element that has a small amount of electric charge because the fuel flows radially and by covering the filter element with a nonconductive element. On the basis of such verification, the inventors have proposed the present invention.

In this embodiment, both the case and the housing cover the filter element. In such a double structure, at least the outer cover should be nonconductive. It does not matter if the inner cover is conductive or nonconductive. However, the cover for covering the filter element may be of a single structure. For example, the housing may be eliminated and the case 2 may comprise the outermost surface. In this case, the case 2 must be nonconductive.

Second Embodiment of a Filter Unit

Figure 12:
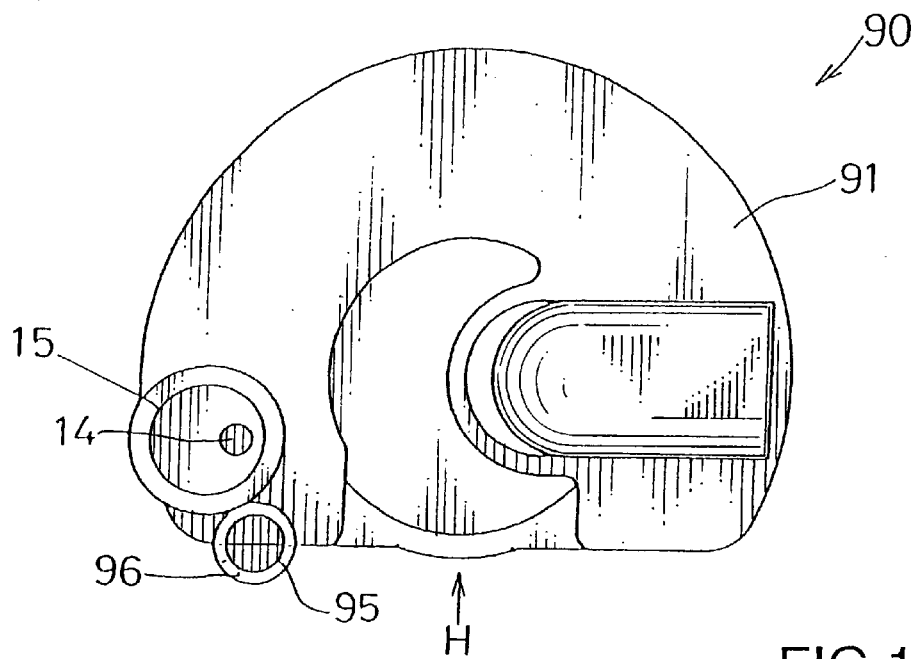
FIG. 12 is a plan view showing a filter unit according to a second embodiment of the invention.
Figure 13:
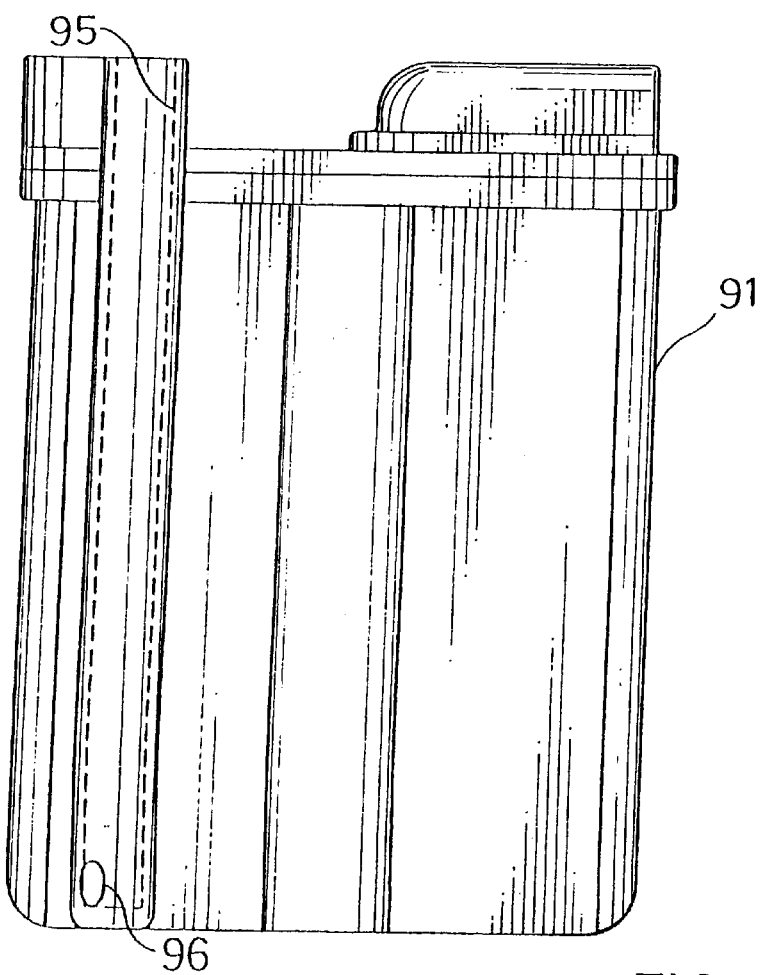
FIG. 13 is a side view as seen from the direction of H in FIG. 12.

A second embodiment will now be explained with reference to FIGS. 12 and 13. A case 91 for a filter unit 90 is provided with a return path 95 that extends from the top surface of the case 91 along the outer peripheral surface thereof. The return path 95 has a circular cross section at the top of the case 91 so as to be opposite to or connectable to a return pipe or a discharge port of a pressure regulator. A portion of the return path 95 along the outer peripheral surface of the case 91 has a semicircular cross section. On a lower portion of the sidewall of the return path 95, a discharge port 96 is provided for discharging return fuel into the liquid fuel. The return path 95 constitutes a fuel return passage. Other elements are the same as the filter unit shown in FIGS. 1 to 3 and therefore, their description will not be repeated.

In this embodiment, the return fuel is directed into the liquid fuel by the return path 95, so that returning fuel sounds can be reduced more effectively.

The cross section of the return path 95 may be formed into various shapes other than a circular or a semicircular shape. A plurality of return paths 95 may be provided. Preferably, the return path and the case may be integrally formed of a synthetic resin.

Second Embodiment of a Filter

Figure 14:
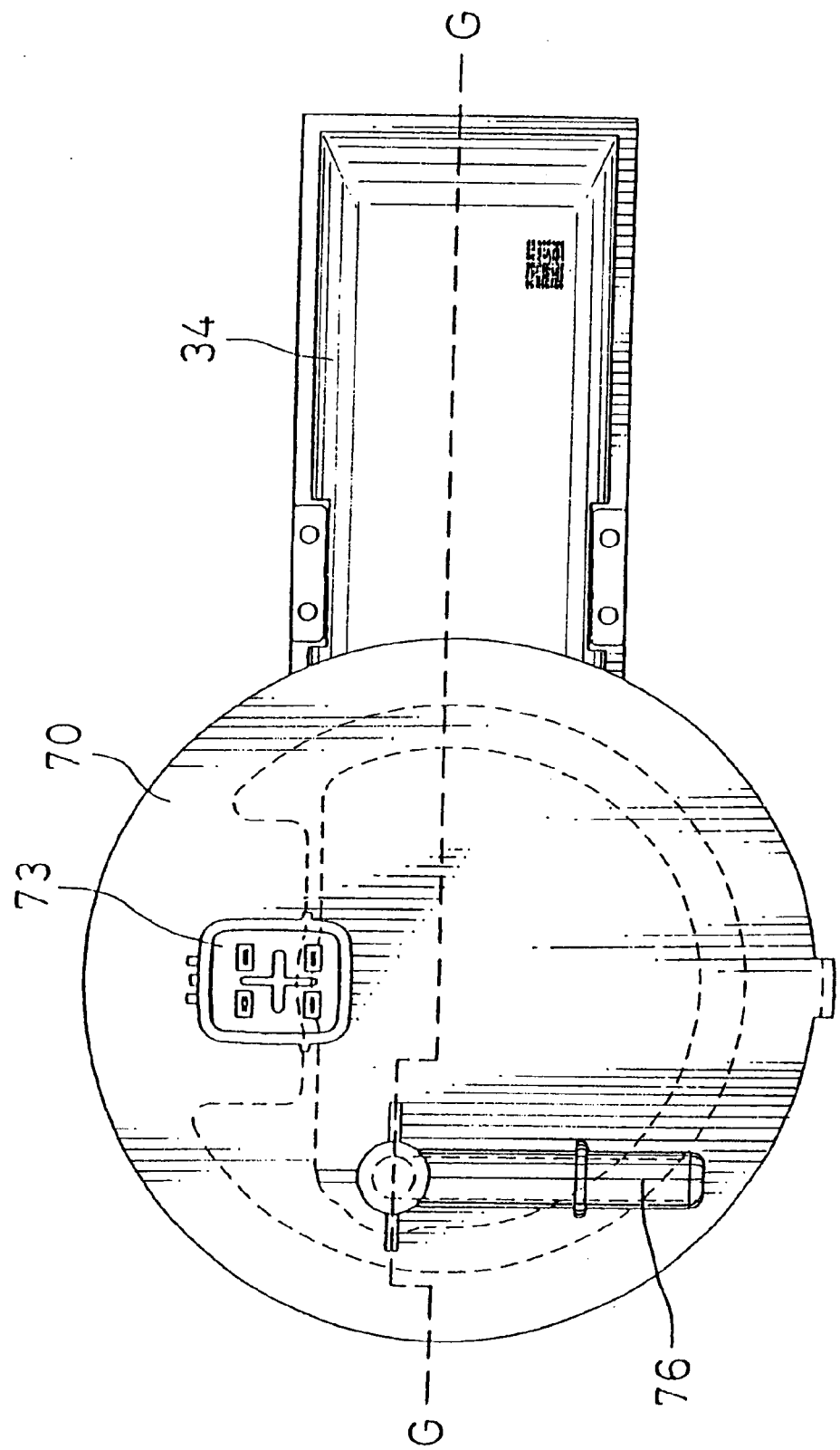
FIG. 14 is a plan view showing a filter according to the second embodiment.
Figure 15:
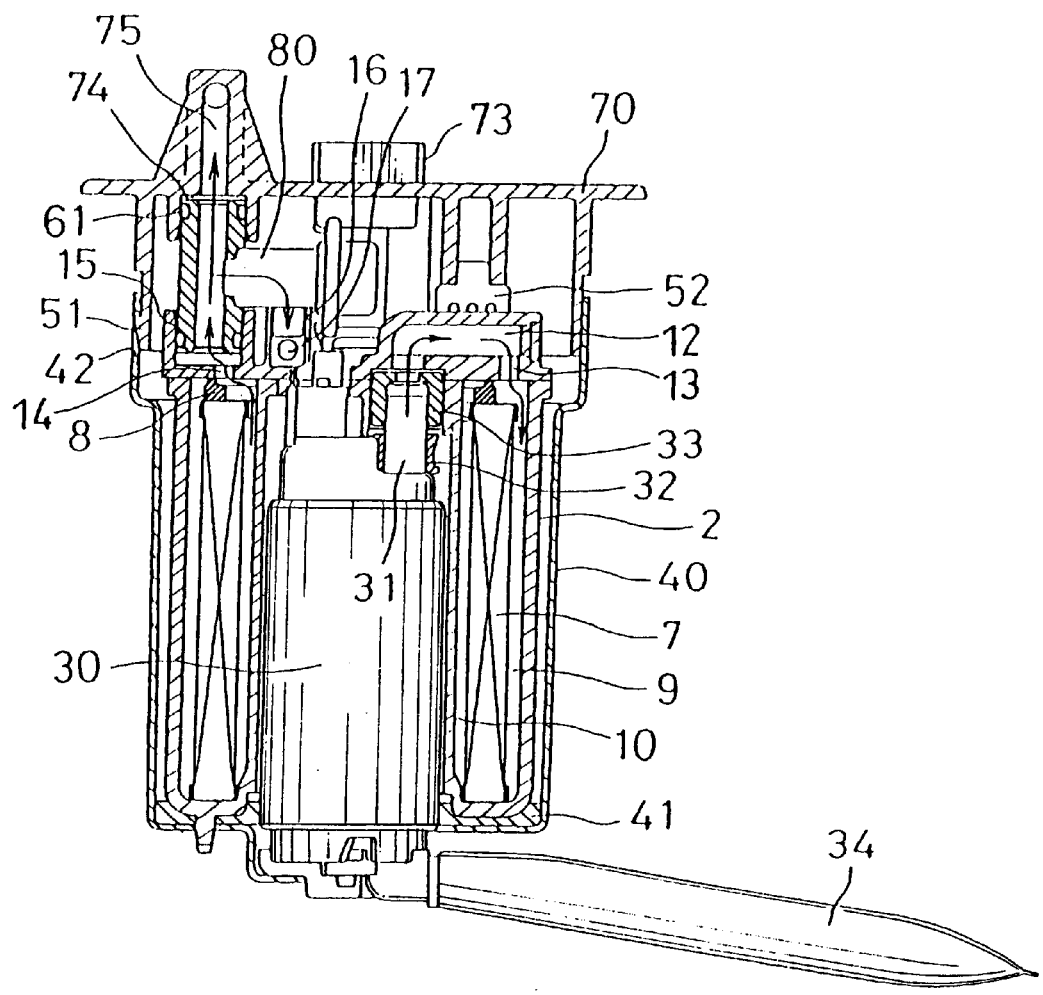
FIG. 15 is a sectional view taken along line G—G in FIG. 14.

FIGS. 14 and 15 show a filter in which a pressure regulator 80 as well as a pump 30, a housing body 40 and a housing cap 70 are assembled with the filter unit 1 shown in FIGS. 1 to 3. FIG. 15 is a sectional view taken along line G—G in FIG. 14.

Figure 8:
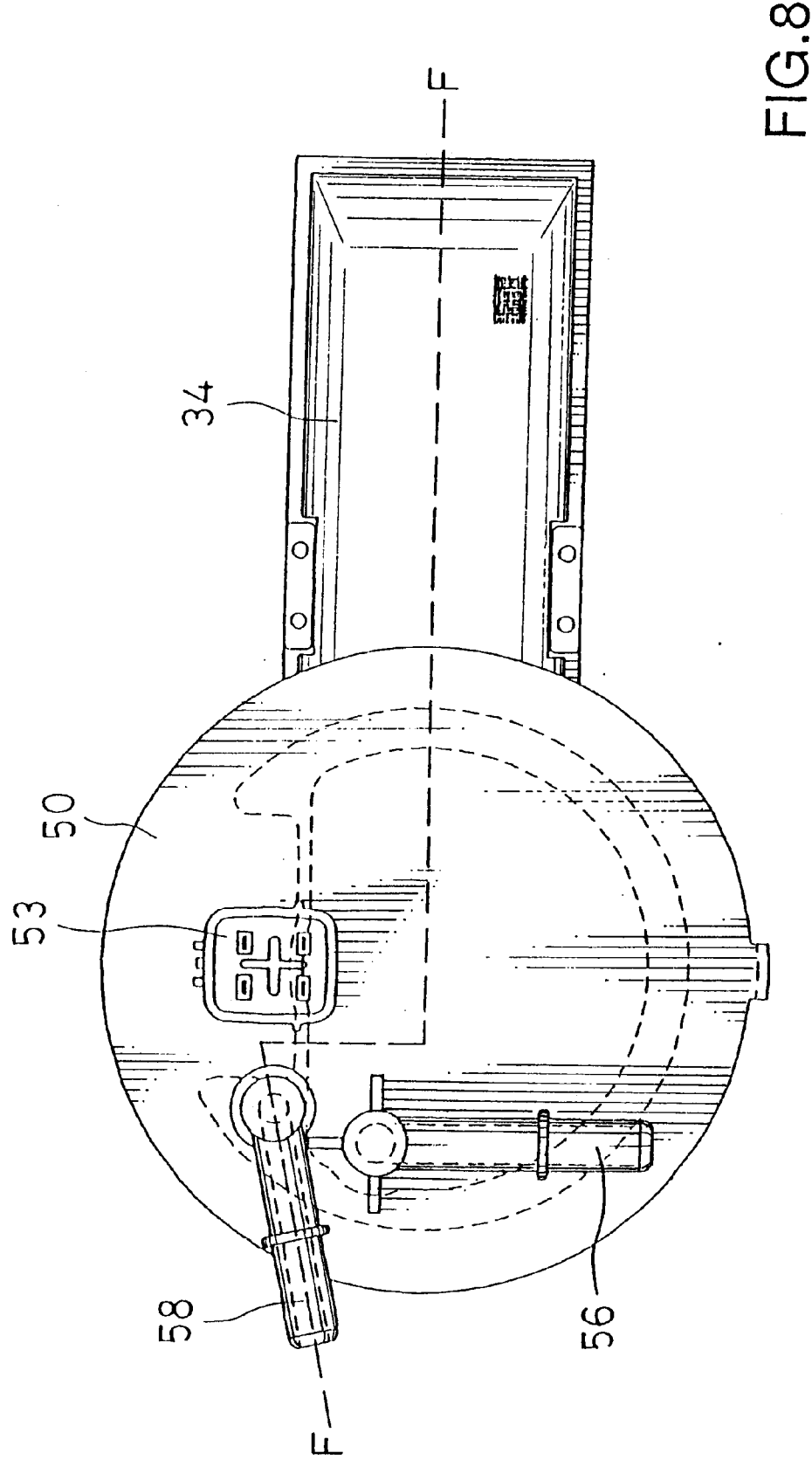
FIG. 8 is a plan view showing a filter according to the first embodiment.

Like the filter shown in FIGS. 8 and 9, the fuel pump 30 is assembled in the case 2 of the filter unit 1 and the case 2 is enclosed in the housing body 40. The housing body 40 is then covered with the housing cap 70.

At this time, the pressure regulator 80 is mounted via the O-ring 61 between the outlet mounting hole 15 of the case 2 and a mounting hole 74 formed in the housing cap 70. The mounting hole 74 is connected to a feed pipe fitting 76 via a fuel path 75.

The fuel discharge port of the pressure regulator 80 is positioned opposite to or connected to the cylinder 16 for receiving return fuel. Like the module shown in FIGS. 8 and 9, a power terminal of the fuel pump 30 is connected to a power supply connector 73 and the cushion 52 and the primary filter 34 are also provided.

The operation of a filter module shown in FIGS. 14 and 15 will now be explained. Fuel pumped by the fuel pump 30 is directed to the pressure regulator 80 through the delivery port 31, the fuel path 12, the fuel inlet port 13, the fuel inlet chamber 9, the filter element 7, the fuel outlet chamber 10 and the fuel outlet port 14. The pressure regulator 80 discharges the fuel from the fuel discharge port to the return fuel receiving cylinder 16 when the fuel pressure within the fuel path 75 exceeds a predetermined value. The fuel discharged into the cylinder 16 flows through the plurality of openings 17 of the cylinder 16 and along the surface of the case 2 back to the liquid fuel. As a result, the fuel pressure within the fuel path 75 is maintained at a set pressure. The fuel adjusted to the set pressure is supplied to a fuel injector through the feed pipe fitting 76 and a feed pipe (not shown).

Figure 16:
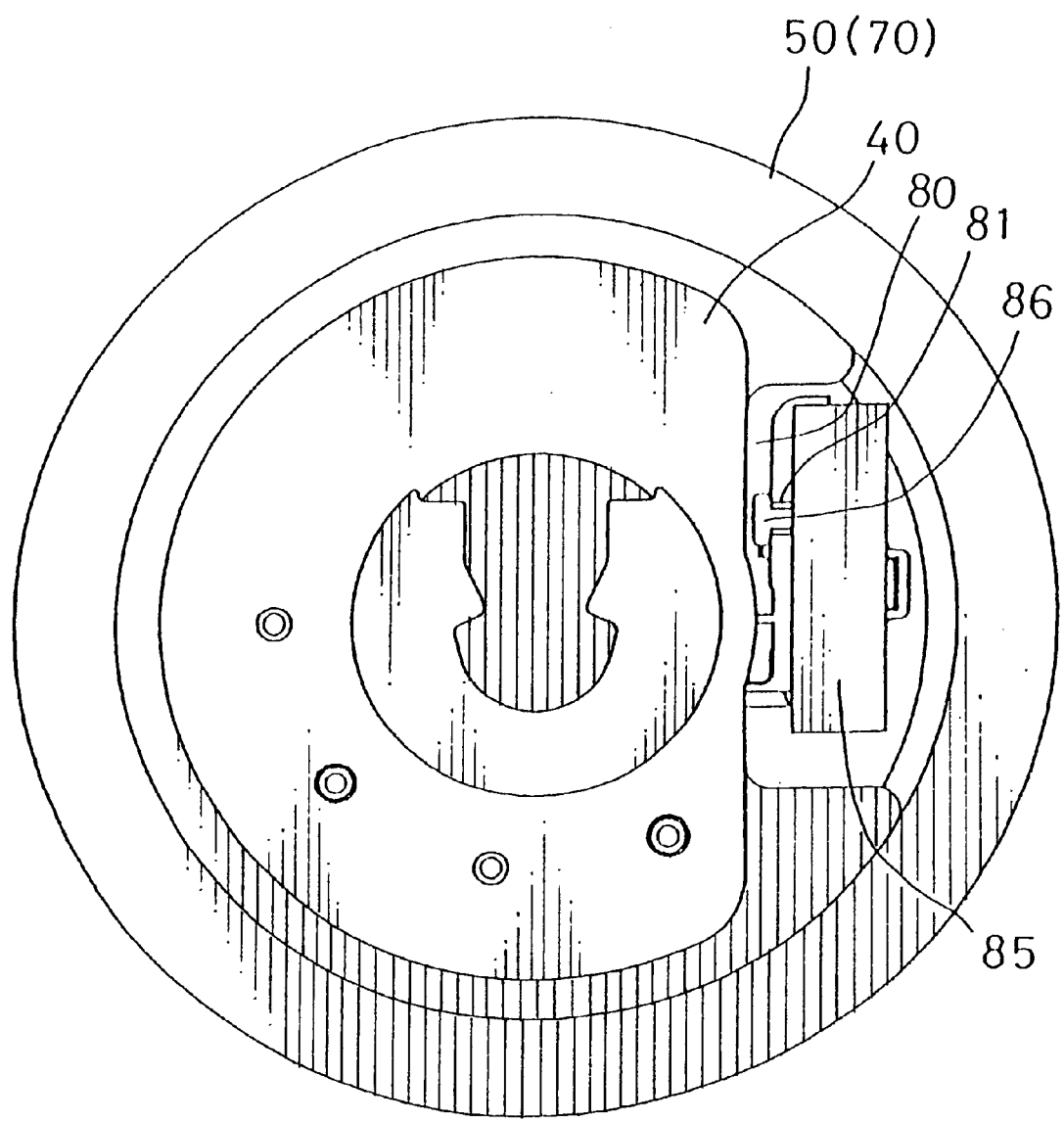
FIG. 16 is a plan view showing attachments assembled on the filter.

FIG. 16 shows the filter module assembled with a sensor and other attachments. A mounting portion 80 is provided in the remaining space cut out from the cylindrical configuration that defines a configuration of the housing body 40 having a D-shaped cross section. A sensor 85, such as a fuel gauge or a thermistor, is attached to the housing body 40 by engaging an engaging portion 86 of the sensor 85 with a groove 81 of the mounting portion 80.

With the attachments such as a sensor being assembled in the cutout portion of the cylindrical configuration of the housing body 40, the outer diameter of the filter with such attachments is substantially equal to the housing body 40. Therefore, the filter module can be inserted into the tank through a circular mounting hole in the tank.

Third Embodiment of a Filter

Figure 17:
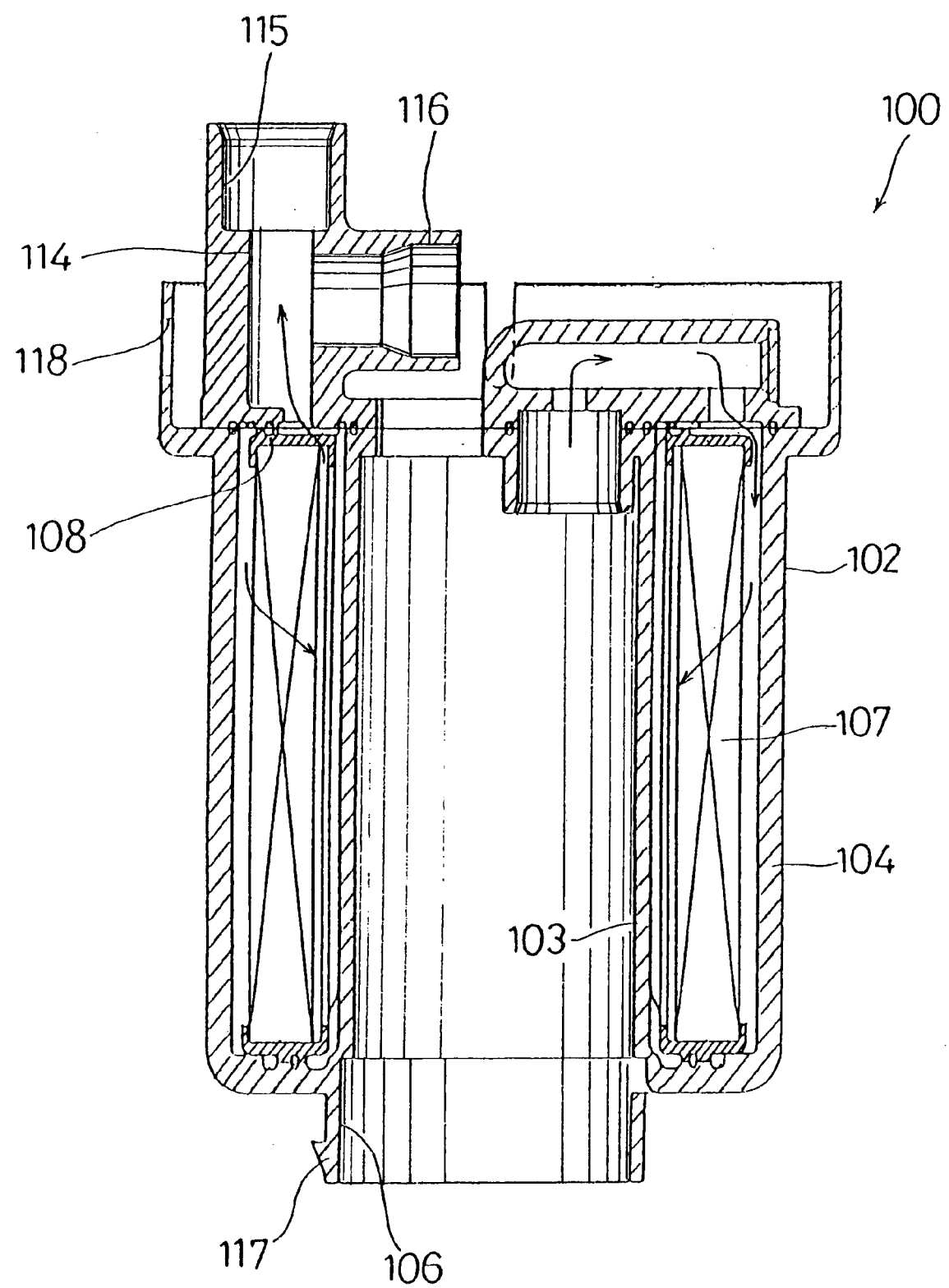
FIG. 17 is a sectional view showing a filter unit according to a third embodiment of the invention.
Figure 18:
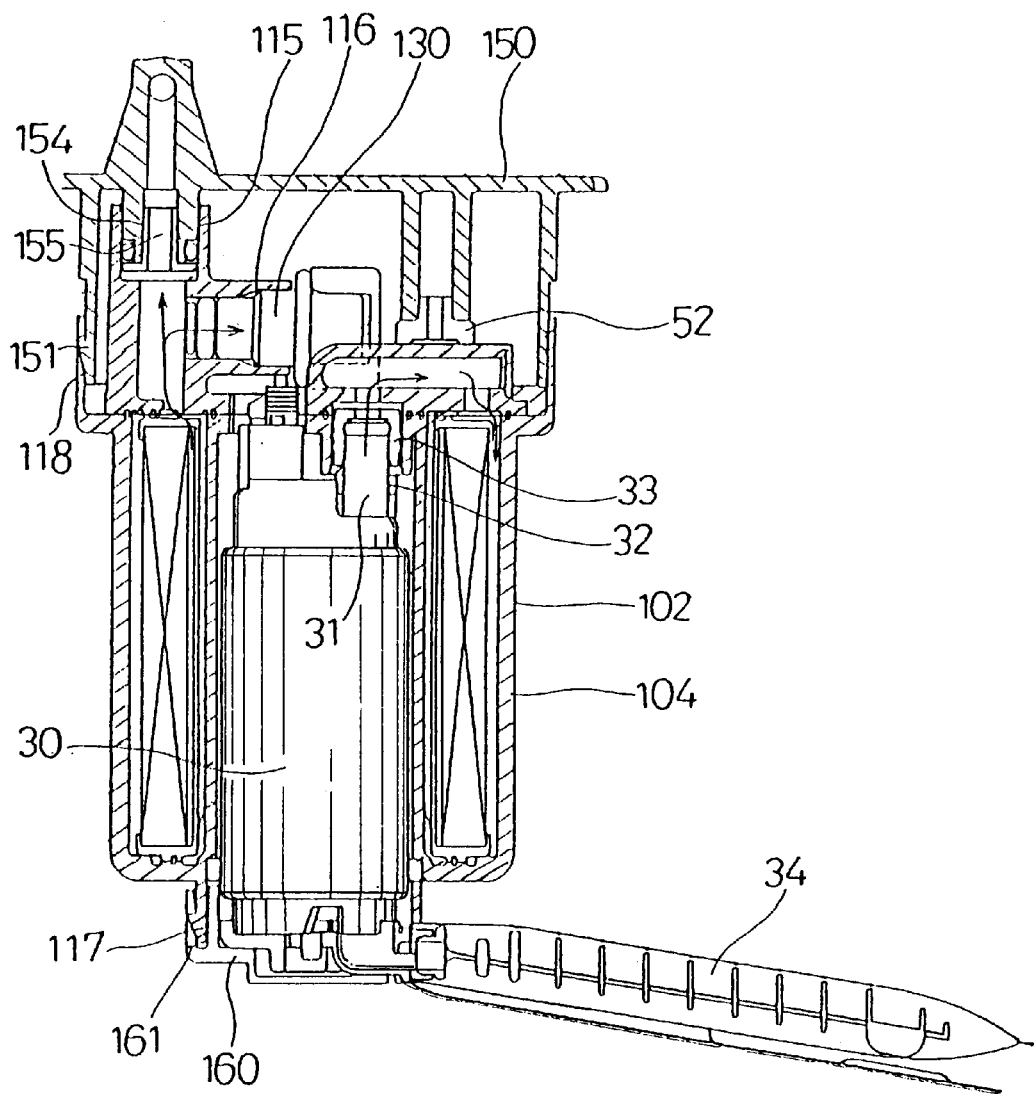
FIG. 18 is a sectional view of a filter according to the third embodiment.

In the above embodiments, the case is contained within the housing, and the housing is made of a nonconductive material. However, the case also may be used as the housing. This embodiment is shown in FIGS. 17 and 18. FIG. 17 is a sectional view of a filter unit 100 and FIG. 18 is a sectional view of a filter formed by assembling a pump or other elements on the filter unit. In this case, a case 102 constitutes the surface of the filter.

The case 102 of the filter unit 100 is made of a nonconductive material, such as a nonconductive resin. The case 102 has an inner peripheral wall 103 and an outer peripheral wall 104. A filter element 107 is mounted between the inner peripheral wall 103 and the outer peripheral wall 104 via a shield element 108 such that a fuel inlet chamber and a fuel outlet chamber are formed on the outer peripheral side and on the inner peripheral side of the filter element 107. A fuel outlet port 114 is provided to communicate with the fuel outlet chamber and has an outlet mounting hole 115 and a mounting hole 116 for mounting a pressure regulator 130. Further, the case 102 has a hole 118 for mounting a set plate 150 on the top surface, has an inserting port 106 for inserting the pump 30 and an engaging portion 117 for mounting a cover 160 on the bottom surface.

In order to form a filter by assembling the pump 30 with the filter unit 100, the pump 30 is inserted through the inserting port 106 of the case 102 and the pressure regulator 130 is connected to the mounting hole 116. Then, the set plate 150 is mounted on the case 102 by engaging an engaging portion 151 with the hole 118 of the case 102. At this time, a fuel supply pipe 155 is mounted between the outlet mounting hole 115 of the case 102 and a mounting hole 154 of the set plate 150. Further, the primary filter 34 is connected to the suction port of the fuel pump 30. Then, the cover 160 is mounted on the case 102 by engaging the engaging portion 117 of the case 102 with a hole 161 of the cover 160.

When such a filter unit 100 is used, electric charge is generated on the surface of the case 102 when fuel passes through the filter unit 100. When the fuel remaining in the tank becomes less, electric charge tends to readily build up on the surface of the case 102. However, corona discharges are generated between the surface of the case 102 and vaporized fuel within the tank. The corona discharge does not cause any particular problem because of its low discharge energy. In this case, because the case 102 is made of a nonconductive material, it has higher bulk resistivity than conductive material, so that the electric charge built up on the case 102 is not rapidly discharged. Further, if the case 102 contacts the tank during some operation and thus the electric charge on the case 102 is discharged, the built-up electric charge is not rapidly changed. Therefore, a spark discharge will not be generated when the electric charge on the case 102 is discharged. In this embodiment, the housing is eliminated, so that the filter cost can be reduced.

In the above embodiments, the filter has been described as being formed by assembling the fuel pump within the fuel filter unit. However, the fuel filter unit may be singly disposed for use within the tank. Further, the cross-sectional shape of the case has been described as being D-shaped, but it may be circular, C-shaped, or various other shapes. Although the housing and the case have been described as being made of nonconductive materials and the return fuel has been described as being directed along the surface of the case, it may be designed to satisfy only one of these conditions.

Further, the fuel filter has been described as having a structure in which the case is contained in the housing or in which the case is used also as a housing, but the structure of the fuel filter is not limited to these structures. In addition, because spark discharge is most likely to be generated when the case is brought into contact with the tank during some operation, at least the outer peripheral surface that is most likely to be brought into contact with the tank may be made of a nonconductive material.

As described above, according to the filter of the present invention, the surface of the filter is made of a nonconductive material. Thus, the electric charge does not rapidly move when the electric charge built up on the surface of the filter is discharged. Therefore, with a filter having a simple construction, spark discharge can be prevented from being generated by electric charge that will be generated when the fuel passes through the fuel filter.

What is claimed is:

1. A fuel filter unit arranged and constructed to be utilized within a fuel tank, comprising:
    a fuel filter element,
    a lower housing having a first space for receiving a fuel pump and a second space for receiving the fuel filter element,
    a fuel filter case disposed within the lower housing, the fuel filter element being disposed within an enclosed portion of the fuel filter case and the first space being defined within the fuel filter case, and
    a pressure regulator disposed above a top surface of the fuel filter case, the fuel filter case further comprising a fuel discharge port arranged and constructed to return excess fuel discharged by the pressure regulator to the top surface of the filter case,
    wherein the lower housing is arranged and constructed to contact fuel disposed within the fuel tank, the lower housing being made of a non-conductive material.

2. A fuel filter unit as in claim 1, wherein the lower housing is made of a non-conductive resin and has a bulk resistivity of about $10^8$ to $10^{10}$ $\Omega \cdot cm$.

3. A fuel filter unit in claim 1, wherein the fuel filter element is generally C-shaped and further comprises a generally C-shaped upper end plate fixed to an upper end surface of the fuel filter element, a generally C-shaped lower end plate fixed to a lower end surface of the fuel filter element, a pair of side end plates fixed to side ends of the fuel filter element and a resilient shield element joined to an outer surface of the end plates, wherein the shield element contacts the filter case in order to provide a watertight seal between edges of the fuel filter material and an interior surface of the fuel filter case.

4. A fuel filter unit as in claim 1, wherein the filter case is constructed and arranged to return the excess fuel discharged by the pressure regulator to the fuel tank by flowing along an outer surface of the filter case when a top level of the fuel that is disposed in the fuel tank is lower than the top surface of the filter case.

5. A fuel filter unit as in claim 4, wherein a clearance is defined between the fuel pump and the filter case and the excess fuel is directed to flow through the clearance in order to return to the fuel reservoir.

6. A fuel filter unit as in claim 1, further comprising an upper housing joined to the lower housing, wherein the pressure regulator is disposed within the upper and lower housing.

7. A fuel filter unit as in claim 6, wherein the upper housing also has a bulk resistivity of about $10^8$ to $10^{10}$ $\Omega \cdot cm$.

8. A fuel filter apparatus as in claim 1, wherein the filter element is generally cylindrical and comprises a sheet-like filter material that is pleated along a plurality of parallel lines.

9. A fuel filter apparatus as in claim 1, wherein pressurized fuel is directed to flow radially through the filter element.

10. A fuel filter apparatus arranged and constructed to be utilized within a fuel tank, comprising:
    a fuel pump,
    a fuel filter element, and
    a generally cylindrical filter case having an inner peripheral wall and an outer peripheral wall, wherein a first space is defined within the inner peripheral wall and a second space is defined between the inner peripheral wall and the outer peripheral wall, the fuel pump is disposed within the first space and the fuel filter element is disposed within second space and wherein at least the portion of the filter case that surrounds the fuel pump and contacts fuel in the fuel tank has a bulk resistivity of about $10^8$ to $10^{10}$ $\Omega \cdot cm$.

11. A fuel filter apparatus as in claim 10, wherein the fuel pump is generally cylindrical and has an outer periphery, the fuel filter element is concentrically disposed around the outer periphery of the generally cylindrical fuel pump to form an integral filter unit and the filter element separates the interior of the filter case into a first chamber and a second chamber, the integral filter unit being disposed within the fuel tank and adapted to exhaust pressurized fuel outside of the fuel tank.

12. A fuel filter apparatus as in claim 11, further comprising a pressure regulator disposed above a top surface of the filter case, wherein the filter case further comprises a fuel discharge port constructed and arranged to return excess fuel discharged by the pressure regulator to a top surface of the filter case.

13. A fuel filter apparatus as in claim 12, wherein the filter case is constructed and arranged to direct the excess fuel disposed on the top surface of the filter case to return to the fuel tank by flowing along an outer surface of the filter case when a top level of the fuel that is disposed in the fuel tank is lower than the top surface of the filter case.

14. A fuel filter apparatus as in claim 13, wherein the filter element is generally cylindrical and comprises a sheet-like filter material that is pleated along a plurality of parallel lines.

15. A fuel filter apparatus as in claim 14, wherein pressurized fuel is directed to flow radially through the filter element.

16. A fuel filter apparatus as in claim 10, further comprising a pressure regulator disposed above a top surface of the filter case, wherein the filter case further comprises a fuel discharge port constructed and arranged to return excess fuel discharged by the pressure regulator to the top surface of the filter case.

17. A fuel filter apparatus as in claim 16, wherein the filter case is constructed and arranged to direct the excess fuel disposed on the top surface of the filter case to return to the fuel tank by flowing along an outer surface of the filter case when a top level of the fuel that is disposed in the fuel tank is lower than the top surface of the filter case.

18. A fuel filter apparatus as in claim 10, wherein the filter element is generally cylindrical and comprises a sheet-like filter material that is pleated along a plurality of parallel lines.

19. A fuel filter apparatus as in claim 10, wherein pressurized fuel is directed to flow radially through the filter element.

20. A fuel filter apparatus as in claim 10, wherein the fuel filter element is generally C-shaped and further comprises a generally C-shaped upper end plate fixed to an upper end surface of the fuel filter element, a generally C-shaped lower end plate fixed to a lower end surface of the fuel filter element, a pair of side end plates fixed to side ends of the fuel filter element and a resilient shield element joined to an outer surface of the end plates, wherein the shield element contacts the filter case in order to provide a watertight seal between edges of the fuel filter material and an interior surface of the filter case.

21. An apparatus comprising:
a pressure regulator,
a filter case having a top surface and a side surface defined when the filter case is disposed in a substantially vertical direction, the filter case further comprising a fuel discharge port constructed and arranged to return excess fuel discharged by the pressure regulator to the top surface of the filter case, wherein the filter case is made of a substantially non-conductive material, and
a fuel filter element disposed within the filter case.

22. An apparatus as in claim 21, wherein the filter case is constructed and arranged to direct excess fuel disposed on the top surface of the filter case to flow along the side surface of the filter case when a top level of the fuel that is disposed in a fuel tank is lower than the top surface of the filter case.

23. An apparatus as in claim 21, wherein the filter case has a bulk resistivity of about $10^8$ to $10^{10}$ Ω·cm.

24. An apparatus as in claim 21, wherein the filter element is disposed around the outer periphery of the generally cylindrical pump to form an integral filter unit and the filter element separates the interior of the filter case into a first chamber and a second chamber, the integral filter unit being disposed within a fuel tank and exhausting pressurized fuel outside of the fuel tank.

25. An apparatus as in claim 24, wherein the filter element is generally cylindrical and comprises a sheet-like filter material that is pleated along a plurality of parallel lines.

26. An apparatus as in claim 21, wherein the apparatus is designed to direct pressurized fuel to flow radially through the fuel filter element.

27. A method of reducing static electricity on a fuel filter case disposed within a fuel reservoir when the fuel level within the fuel reservoir is below a top surface of the fuel filter case comprising:
directing excess fuel discharged from a fuel pressure regulator to the top surface of the fuel filter case, whereby static electricity on the fuel filter case can discharge to the excess fuel disposed on the top surface of the fuel filter case.

28. A method as in claim 27, further comprising directing excess fuel disposed on the top surface of the fuel filter case to flow along a side surface of the filter case before returning to the fuel reservoir.

29. A method as in claim 27, further comprising directing pressurized fuel to flow radially through a filter element disposed within the filter case.

30. A method as in claim 27, wherein the fuel filter case has a bulk resistivity of about $10^8$ to $10^{10}$ Ω·cm.

31. A method of reducing static electricity on a fuel filter case disposed within a fuel reservoir when the fuel level within the fuel reservoir is below a top surface of the fuel filter case, the method comprising:
directing pressurized fuel to flow radially through a filter element disposed within the fuel filter case,
directing excess fuel discharged from a fuel pressure regulator to the top surface of the fuel filter case, whereby static electricity on the fuel filter case can discharge to the excess fuel disposed on the top surface of the fuel filter case, and
directing excess fuel disposed on the top surface of the fuel filter case to flow along a side surface of the filter case before returning to the fuel reservoir.

32. A method as in claim 31, wherein the fuel filter case has a bulk resistivity of about $10^8$ to $10^{10}$ Ω·cm.

33. An in-tank system filter arranged and constructed to be disposed for use within a fuel reservoir, comprising:
a generally cylindrical pump having a pressurized fuel delivery port;
a generally double cylindrical filter case disposed around an outer periphery of the pump and having an inner peripheral wall, an outer peripheral wall, and a pair of upper and lower end peripheral walls between the two peripheral walls;
a generally cylindrical filter element disposed in the filter case and separating the filter case into inner and outer chambers;
a first passage coupling the pressurized fuel delivery port of the pump to one of the chambers in the filter case; and
a second passage coupling the other of the chambers in the filter case to a fuel passage for delivering fuel to outside of a fuel tank;
wherein the filter case is made of a nonconductive material having a bulk resistivity of about $10^8$ to $10^{10}$ Ω·cm and foreign matter in the fuel is filtered by causing the fuel to flow radially through the filter element.

34. An in-tank system filter as defined in claim 33, wherein a clearance is defined between the outer periphery of the pump and the inner peripheral wall of the filter case and excess fuel discharged by a pressure regulator is directed to flow into the clearance before returning to the fuel reservoir.

35. An in-tank system filter as defined in claim 33, wherein the filter element comprises a sheet-like filter material that is pleated along a plurality of parallel lines and is curved as a whole.

36. An in-tank system filter as defined in claim 33, further comprising a pressure regulator disposed above a top surface of the filter case, wherein the filter case further comprises a fuel discharge port constructed and arranged to return excess fuel discharged by the pressure regulator to the top surface of the filter case.

37. An in-tank system filter as defined in claim 36, wherein the filter case is constructed and arranged to return the excess fuel discharged by the pressure regulator to the fuel reservoir by flowing along an outer surface of the filter case when a top level of the fuel that is disposed in the fuel reservoir is lower than the top surface of the filter case.

38. An in-tank system filter arranged and constructed to be disposed for use within a fuel reservoir, comprising:
a generally cylindrical pump having a pressurized fuel delivery port;
a generally double cylindrical filter case disposed around an outer periphery of the pump and having an inner peripheral wall, an outer peripheral wall, and a pair of upper and lower end peripheral walls between the two peripheral walls;
a generally cylindrical filter element disposed in the filter case and separating the filter case into inner and outer chambers;
a first passage coupling the pressurized fuel delivery port to one of the chambers in the filter case;

a second passage coupling the other of the chambers in the filter case to a fuel passage for delivering fuel to outside of a fuel tank; and a housing made of a nonconductive material having a bulk resistivity of about $10^8$ to $10^{10}$ Ω·cm, wherein the filter case is dispensed within the housing and foreign matter in the fuel is filtered by causing the fuel to flow radially through the filter element.

39. An in-tank system filter as defined in claim 38, wherein a clearance is defined between the outer periphery to the pump and the inner peripheral wall of the filter case and excess fuel discharged by a pressure regulator is directed to flow into the clearance before returning to the fuel reservoir.

40. An in-tank system filter as defined in claim 38, wherein the filter element comprises a sheet-like filter material that is pleated along a plurality of parallel lines and is curved as a whole.

41. An in-tank system filter as defined in claim 38, further comprising a pressure regulator disposed above a top surface of the filter case, wherein the filter case further comprises a fuel discharge port constructed and arranged to return excess fuel discharged by the pressure regulator to the top surface of the filter case.

42. An in-tank system filter as defined in claim 41, wherein the filter case is constructed and arranged to return the excess fuel discharged by the pressure regulator to the fuel reservoir by flowing along an outer surface of the the fuel reservoir is lower than the top surface of the filter case.

* * * * *